US006215491B1

(12) United States Patent
Gould

(10) Patent No.: US 6,215,491 B1
(45) Date of Patent: *Apr. 10, 2001

(54) COMPUTER USER INTERFACE WITH NON-SALIENCE DEEMPHASIS

(75) Inventor: Eric Justin Gould, Austin, TX (US)

(73) Assignee: Monkeymedia, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,275

(22) Filed: Nov. 30, 1999

Related U.S. Application Data

(63) Continuation of application No. 08/844,466, filed on Apr. 18, 1997, which is a continuation of application No. 07/990,339, filed on Dec. 14, 1992, now Pat. No. 5,623,588.

(51) Int. Cl.[7] .................................................. G06F 13/00

(52) U.S. Cl. ........................ 345/341; 345/973; 345/123; 345/127; 345/439

(58) Field of Search ........................... 345/341, 94, 973, 345/974, 439, 115, 121, 123, 124, 125, 127, 128, 129, 130, 134

(56) References Cited

U.S. PATENT DOCUMENTS

| 4,790,028 | 12/1988 | Ramage | 382/298 |
|---|---|---|---|
| 4,931,783 | 6/1990 | Atkinson | 345/163 |
| 5,050,961 | 9/1991 | Venolia | 359/465 |
| 5,146,212 | 9/1992 | Venolia | 345/145 |
| 5,159,668 | 10/1992 | Kaasila | 345/469 |
| 5,261,031 | 11/1993 | Saito | 345/440 |
| 5,339,391 | 8/1994 | Wroblewski et al. | 345/341 |
| 5,434,954 | * 7/1995 | Kawauchi et al. | 345/140 |
| 5,579,463 | 11/1996 | Takano et al. | 345/440 |

OTHER PUBLICATIONS

Eric Justin Gould, "Relativity Controller Reflecting User Perspective In Document Spaces," Interactive Telecommunications Program, New York Univ., Inter CHI '93 Adjunct Proceedings.

"Systems Application Architecture: Common User Access, Advanced Interfaces Design Guide," IBM Corp., 1998, pp. 99–101.

"Systems Application Architecture: Common User Access, Advanced Interfaces Design Guide," IBM Corp., 1998, pp. 99–101.

Mackinlay et al., "The Perspective Wall: Detail And Context Smoothly Integrated," Proceeding ACM CHI '91, Human Factors In Computing Systems conference (New Orleans, LA, Apr. 27–May 2, 1991), ACM, New York, pp. 173–79.

George W. Fumas, "Generalized Fisheye Views," Proceedings ACM CHI '86, Human Factors In Computing Systems conference (Boston, MA, Apr. 12–17, 1986) ACM, New York, pp. 16–23.

Mills & Wong, "A Magnifier Tool For Video Data," Proceedings ACM CHI '92, Human Factors In Computing Systems conference (Monterey, CA, May 3–7, 1992), ACM, New York, pp. 93–98.

(List continued on next page.)

Primary Examiner—Ba Huynh
(74) Attorney, Agent, or Firm—Carlton Fields et al.

(57) ABSTRACT

A relativity controller is a scroll bar/window combination that provides a way to see data in relation to both the context of its wholeness and the salience of its contents. To accomplish this, the linear density or other appearance of the scroll bar (acting as a ruler or scale) varies with the density of the document salience (as indicated by different kinds of annotations or marks). It also provides a way to zoom between perspectives. This is usable on many different data types: including sound, video, graphics, calendars and word processors.

5 Claims, 41 Drawing Sheets

OTHER PUBLICATIONS

Degan et al., "Working With AudioL Integrating Personal tape recorders And Desktop Computers," Proceedings ACM CHI '92, Human Factors In Computing Systems conference (Monterey, CA, May 3–7, 1992), ACM, New York, pp. 413–18.

Richard Cimera, "Value Bars: An Information Visualation And Navigation Tool For Multiattribute Listings," Proceedings ACM CHI '92, Human Factors In Computing Systems conference (Monterey, CA, May 3–7, 1992), ACM, New York, pp. 293–94.

* cited by examiner

Main

Handle Event

Adjust Controls

Scale Cursor

Relative Movies Task

Relative Movies Task

Relative Movies Task

Handle Mouse Down

Handle Mouse Up

Adjust Menus

Handle Menu

Handle Menu

Open Movie

Movie Mouse Down

Movie Mouse Up

Movie Mouse Up

Movie Mouse Up

Draw Controller

Update Scroller

Update Scroller

Track Thumb

Track Thumb

Draw Thumb

Draw Thumb

Add Mark

Add Mark

Draw Mark (in Scroller)

Draw Mark (in Scroller)

Draw Mark (in Scroller)

Draw Mark (in Scroller)

COMPUTER USER INTERFACE WITH NON-SALIENCE DEEMPHASIS

This is a continuation of application Ser. No. 08/844,466, filed on Apr. 18, 1997, which was a continuation in part of application Ser. No. 07/990,339, filed on Dec. 14, 1992, now U.S. Pat. No. 5,623,588.

This invention relates to a computer system, and in particular to computer tools to improve user perspectives and enhance navigation or browsing of information sources stored in or available via the computer.

BACKGROUND OF INVENTION

As computer accessing of large quantities of information increases, the ability of users to navigate large information spaces and to maintain visualization or personal perspectives thereof decreases [1] (bracketed numbers reference publications identified in Appendix A).

The need for this type of control has been expressed most recently by Furnas [2], Mills [3], Degen [4], and Chimera [5].

Furnas' solution to the problem of understanding the limited information available in a window of large information structures is to provide in the window the detailed region to be considered in the context of important preceding or succeeding parts of the large structure. For example, to edit lines in the middle of a program, the window would also display, say, declarations at the beginning of the program. No magnification of desired information or shrinkage of undesired information is employed; rather, the desired program information is normally displayed, and many parts of the program are omitted from the display.

Mills et al addressed the issue of giving users access to video data by magnifying time through successive hierarchial extraction of increasingly detailed segments. Each expanded view was displayed in a separate window of the display. And each segment view, as well as the total video view, including the time lines associated therewith, were linearly arranged from a temporal standpoint.

Degen et al moved marks on audio tape to a digitized counterpart document scroll bar, and let the user change the visual scaling of time within a single window, as well as the speed of playback. But, again, the visual representations, whether of the original size or of the zoomed expanded size, had a linear temporal structure.

Chimera, on the other hand, maintained a full display within the window but was unable to provide a zooming feature or expanded segment view of a text listing. Instead, Chimera used scroll bars that, independent of the original data's representation, indicate relative values of list attributes by respectively scaling proportions of list item indicators, according to those attributes, in the scroll bars.

Furnas shows in a single window multiple fisheye views of document segments. But Purnas doesn't disclose how a user can select which segments to display, or the means to magnify certain segments, or the means to control the degree of magnification, nor does Furnas provided a scroll bar or its equivalent as a convenient interface for the user to manipulate the display.

SUMMARY OF INVENTION

An object of the invention is a computer system providing improved means to allow users to extract important segments of computer-displayed information in the form of video, sound, graphics or text while maintaining a general view of the information.

Another object of the invention is a computerized system and method to enable users better to navigate or visualize large information spaces.

In accordance with one aspect of the present invention, means are provided to enable a user to visibly mark points or segments of displayed information, which will enable the user to quickly navigate to the marked displays.

In another aspect of the invention, a scroll bar is displayed alongside the information display, and the visible mark or marks appears on the scroll bar at locations corresponding to the desired information.

In accordance with a further aspect of the present invention, a computerized system provides the user with means to shrink less important or less significant portions of the information displayed, with the result of magnifying the portions that the user deems significant. In accordance with this aspect, the invention can be viewed as a user-friendly relativity controller tool that enables users to specify what is important to them, and modify the portion of their perceptual space that that information takes up, in a fisheye variant.

In accordance with another aspect of the invention, the resultant information can still occupy the same window where originally displayed, but with certain segments shrunk and other segmemts in comparison standing out or becoming more prominent.

In accordance with still other aspects of the invention, the relativity controller of the invention is implemented by simply pointing to the screen and actuating a control device. In a preferred embodiment, a mouse button is pressed to mark the beginning and end of segments of the information to be marked. A further feature is that multiple segments can be marked in this manner. Thus, the relativity controller of the invention not only allows users to mark the scope of one or more salient segments, but also will cause the display to simultaneously shrink the non-marked portions and in effect zoom into the multiple-marked segments in a single step. The result is a non-linear display of the available information. As a further feature, simultaneously with selective zooming of the information, the display of the scroll bar is correspondingly modified to show in the context of the total information the marked and non-marked portions of the displayed information.

The major benefits is to allow users to quickly navigate through a large information space and to control the salience of the displayed information in the context of the full display while conserving display area, sometime called desktop real estate. Moreover, maintaining a single window for the data and giving users the ability to visually navigate across the whole data via the scroll bar together with the ability to select the salient segments as well as the level of zoom, all in a single step, greatly enhances the ability of the user to cope intelligently and rapidly with large information structures containing large numbers of objects.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

Figure 1:
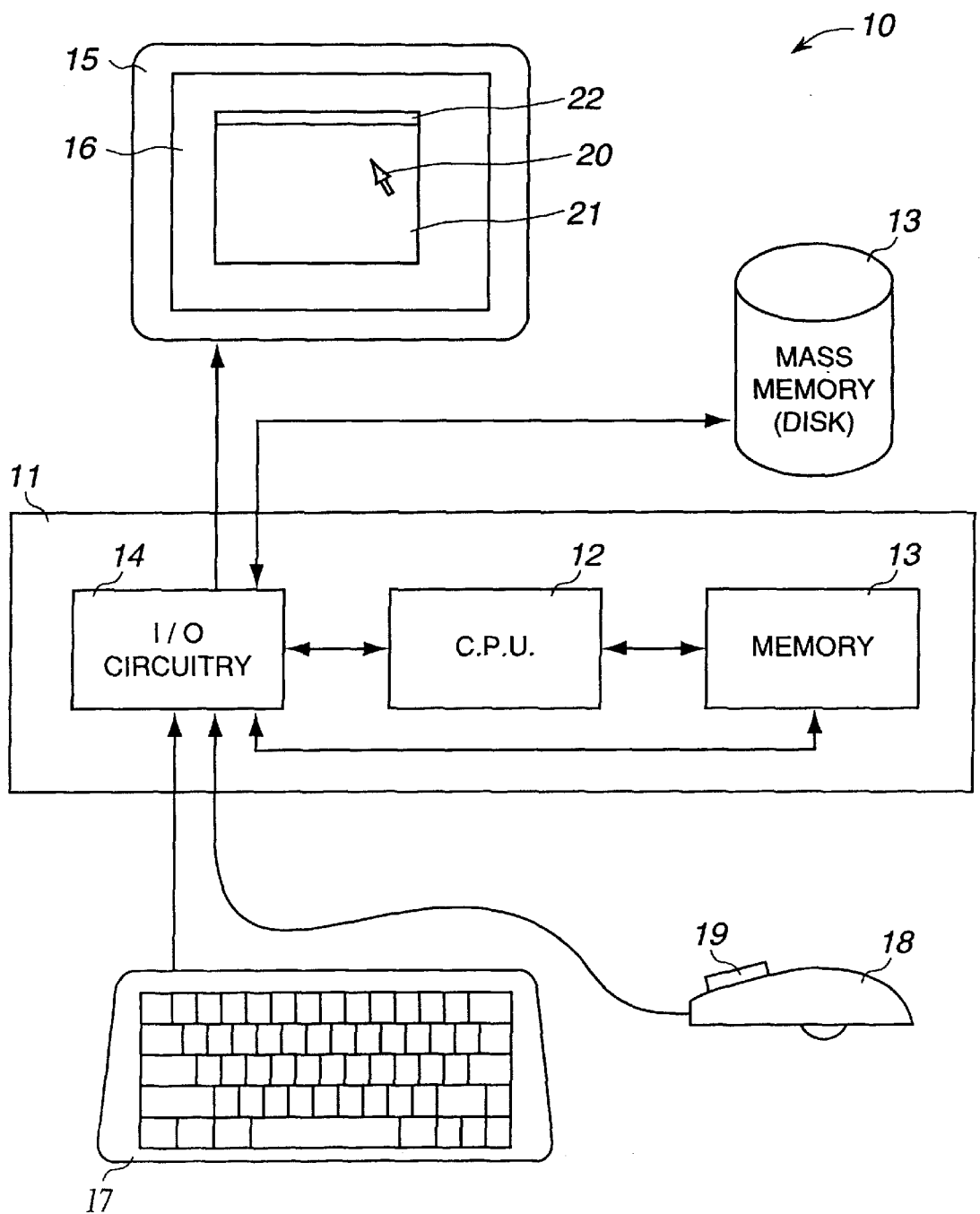
FIG. 1 is a block diagram of a typical computer system.

FIG. 1 shows a typical computerized system 10, comprising a console 11 containing a CPU 12, memory 13 in the form of RAM, ROM and disk, and I/O circuitry 14 connected to a monitor 15 having a display screen 16, and control devices in the form of keyboard 17 and a mouse 18. The mouse 18 typically contains button switches 19 operated by a user of the system. A cursor or pointer 20 is typically displayed on the screen 16 and its position is controllable via the mouse 18 or the keyboard 17 as is well known. A typical window 21 is displayed on the screen 16, with a title bar 22 in the window.

The following terms used herein will have the following meanings.

"Object" means any representation of information or of a data structure that can be displayed on the monitor screen, and includes one or more text characters, one or more sound representations such as a digital sample, a video representation such as a video frame, and in general any graphic's element.

"Control device" means devices manipulated by users to move cursors around a screen, and include a mouse and keyboard.

"Pointing" to an object on screen means actuating the control device to move the cursor so that it is over or adjacent the object. When the cursor is a pointer such an arrow, it means moving the arrow tip close to the object.

"Clicking" on an object means to press and quickly release a switch on the control device, such as a button on a mouse, when the cursor is pointing to the object.

"Dragging" means to click on the object, and while holding the switch activated, to manipulate the control device to move the object to a new screen location, and then to release the switch to fix the new screen location of the object.

"Double-clicking" an object on screen is by pointing to the object and clicking twice rapidly, often used for special control purposes.

"Shrinking" the display of objects means reducing the time or space normally allocated to display the objects, and includes shrinking them to the point where they essentially disappear from the display.

A "scroll bar" is a common control device displayed alongside a window, having, typically, at opposite ends small arrowed scroll boxes or buttons that when clicked on by the user causes the window contents to scroll.

A "button" or "box" on a scroll bar is a representation of a control device for use with a mouse.

A "thumb" is a button or box on the scroll bar, between its ends, which moves and whose location on the scroll bar corresponds to the location in the whole information of the current view.

FIGS. 2–14 illustrate several ways in which the invention may be used. While the invention will be described in connection with a Macintosh personal computer (PC), which employs a graphics user interface (GUI), it is also usable with other PCs or workstations using other operating systems with GUIs, such as UNIX with X-windows, and DOS with Windows.

Figure 2:
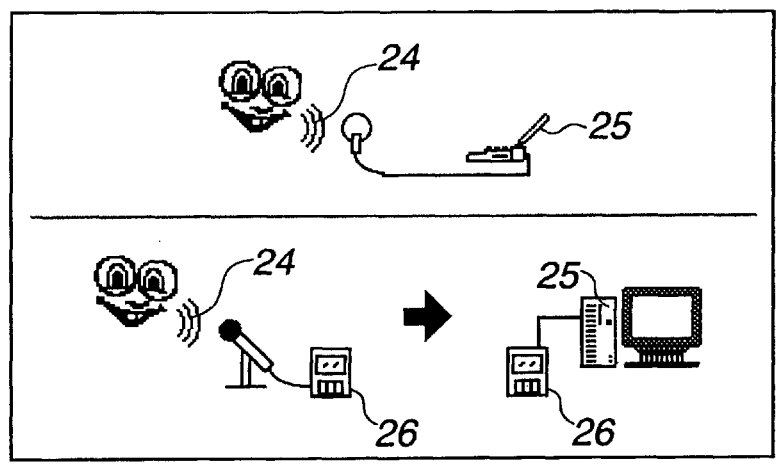
FIGS. 2–6 schematically illustrate one form of the invention for use with audio representations.
Figure 3:
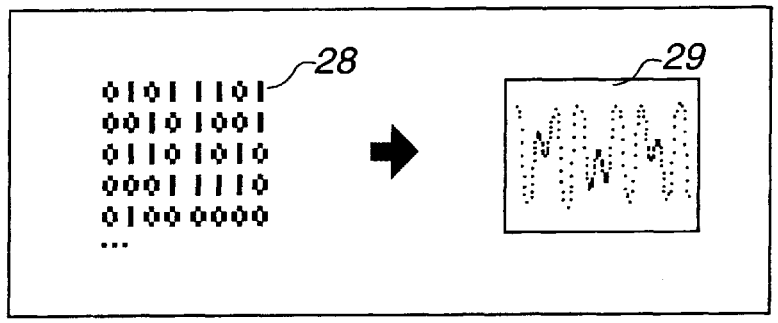
Figure 4:
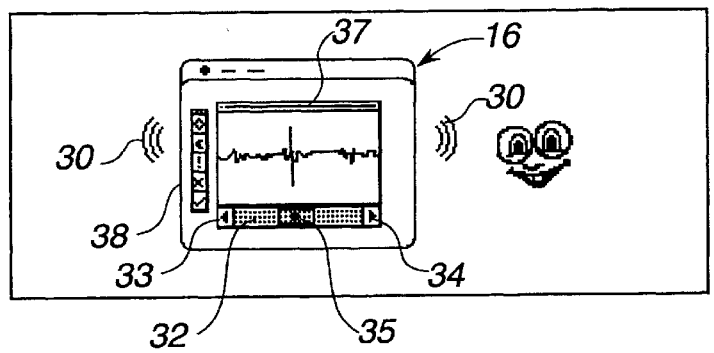

The first example concerns a sound representation. As illustrated in FIG. 2 on top, a user can sample audio 24 into a computer 25 as described in the Macintosh user's manual, or alternatively record audio 24 onto tape 26 and then sample into the computer 25. The computer processes the sound data 28 into a visual representation 29, based, for example, on Cochlear models, principal component analysis, or Fast Fourier Transforms, as shown in FIG. 3. The result is displayed on the monitor screen 16 and can also be heard 30 by the user. The typical monitor screen contains a scroll bar 32 for scrolling through the sound representation using a left arrow button 33 to scroll to the left, and a right arrow button 34 to scroll to the right. A thumb representation or button 35 which is displayed on the scroll bar shows by its location the portion of the sound representation displayed in the context of the whole sound. In other words, if the thumb 35 is at the center of the scroll bar 32, then the sound displayed is at the middle of the recording.

In a usual GUI display, a horizontal title bar 37 is located on top and a vertical menu or tool bar 38 is displayed at the left side. Clicking on any of the icons displayed in the tool bar will invoke appropriate software routines to carry out the function indicated by the icon. In this particular example, the user desires to annotate the sound representation, and the icons can represent an EDIT function, or a DRAW function including certain graphic symbols to be pasted into the sound representation.

In accordance with an aspect of the present invention, the computer has been trained or customized to recognize meaningful objects and mark them. In this particular case, a meaningful object can be any sound representation above a certain amplitude, i.e., loud sounds, but the computer can choose instead certain frequencies or ranges or certain sound sequences. Marking means with respect to the data structure representing the object to add a tag bit or other data representing a marked time or space position or point. If it is desired to mark a segment, meaning a temporal sequence of objects, then one tag data can represent the beginning of the marked segment, and another data bit can represent the end of the marked segment.

Figure 5:
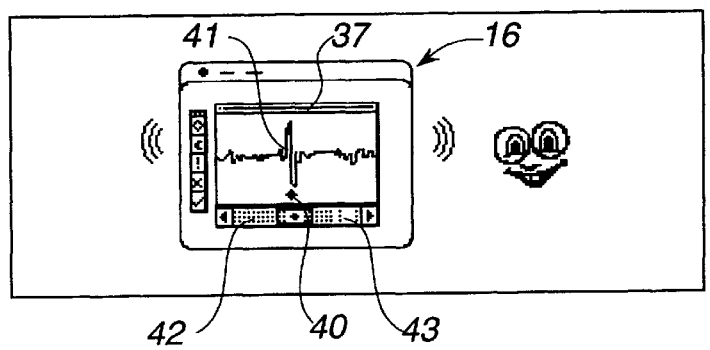

In accordance with another aspect of the present invention, the mark is displayed on the display. In FIG. 5 a diamond mark 40 is shown to indicate the temporal position of the large amplitude sound 41. When marks 40 are displayed at the salient points, the user can quickly fast-forward through the unmarked areas and then stop at or slowly play the marked points or segments by observing the mark or by programming the computer to automatically stop at marked points.

Figure 6:
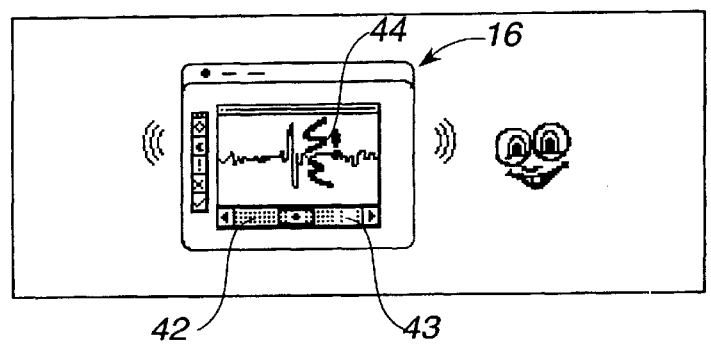

In accordance with another aspect of the invention, the scroll bar temporal representation is modified to display the marked points or segments. In the embodiment illustrated in FIG. 5, a density representation on the scroll bar is modified, with high density regions 42 representing unmarked segments, and low density regions 43 representing marked segments. Thus, while only a portion of the whole stored sound representation may be displayed in the window shown, the scroll bar in the window shown will show the positions of the marked segments or salient points relative to the whole set of objects stored. Thus, the user can quickly navigate to the salient points by the conventional fast forward or rewind buttons to reach and observe the annotated regions. FIG. 6 illustrates the customized annotation 44 added by the user to the. sound representation. These annotations are also useful for indexing, hyper-navigation, and multi-sound catalogs. It is understood that marking 43 on the scroll bar can be used separately (FIG. 6) or together with marking 40 (FIG. 5) on the document display.

Figure 7:
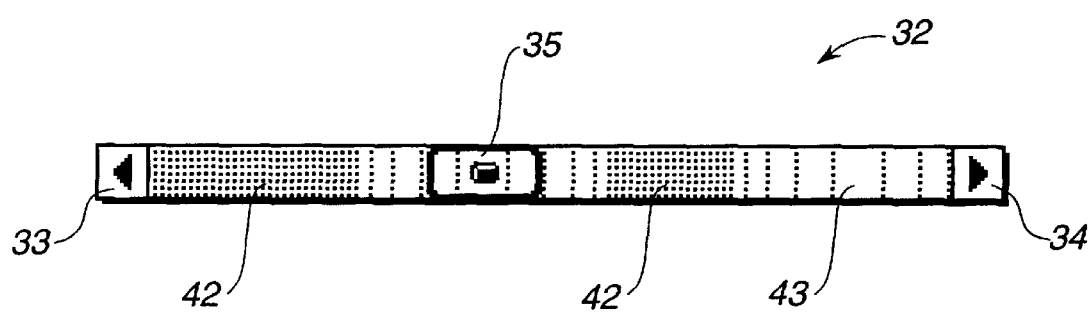
FIG. 7 is an enlarged view of a scroll bar in accordance with another form of the invention.

FIG. 7 shows an enlarged view of the scroll bar 32 indicating how high density 42 and low density 43 appearances can indicate non-marked and marked segments, respectively.

It will also be observed that the scope or range of the marked objects is visible on the scroll bar 32 by the width of low density segments 43.

Figure 8:
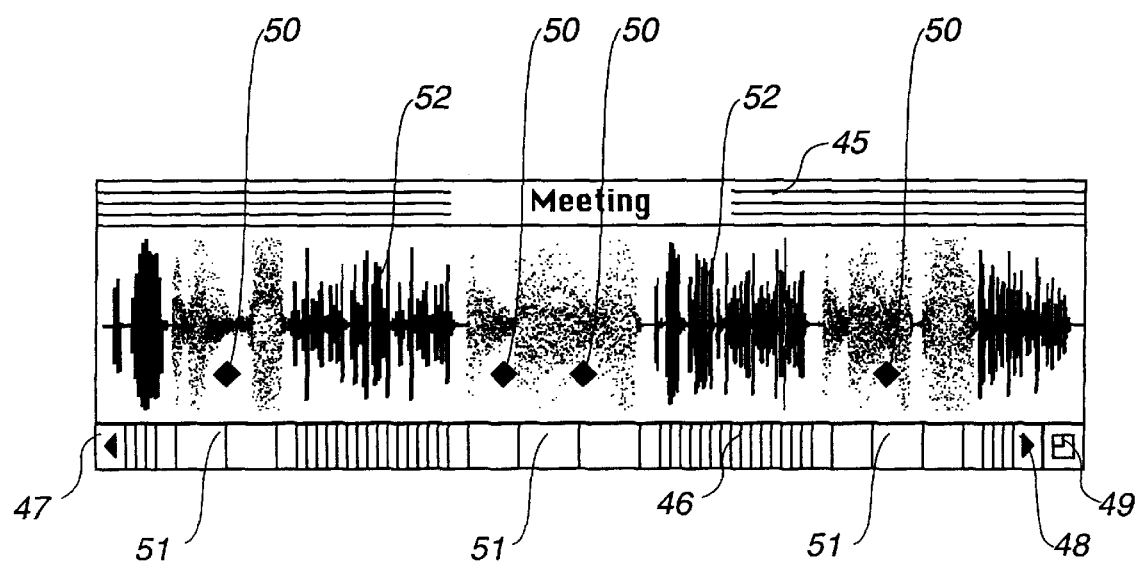
FIG. 8 is a combined screen display and scroll bar of audio information in accordance with the invention.

FIG. 8 shows another view of a screen window with a title bar 45 and a scroll bar 46 having scroll buttons 47 and 48, and a conventional window size button 49. An audio representation is displayed with marks 50 on the display and marks 51 on the scroll bar indicated by the arrows.

In accordance with a further feature of the invention, means can be provided to execute a relativity controller function. This can be implemented automatically whenever a marking of salient points is made, or it can be implemented by, for example, pointing to the scroll bar, clicking, and then dragging the mouse perpendicular to the scroll bar, or it can be implemented, as explained later, by clicking on a special button added to the scroll bar and then dragging the mouse. In the flow charts described later, an option key is also used when clicking on the scroll bar. When the relativity controller function is activated, the computer modifies the linear temporal representation of the sound into a non-linear representation, with the non-marked segments shrunken in time and the marked segments expanded in time into the resultant empty regions and thus magnified. This is also illustrated in FIG. 8 which displays a large portion containing marked segments 51 indicated by the arrows and unmarked segments 52. If the user then plays through that portion of recorded sound, it will play at normal speed through the marked segments 51, but will fast-forward at, say, twice the normal speed through the unmarked segments 52. In the resultant display, the marked segments 51, having been expanded in time, show actual digital samples, whereas the unmarked segments 52 condense the samples into black bars.

Figure 9:
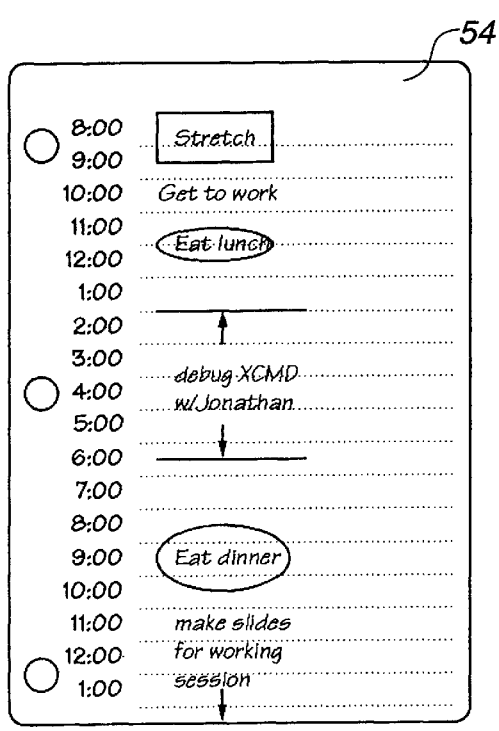
FIGS. 9–11 illustrate various screen displays of text information produced by one form of the computerized system of the invention.
Figure 10:
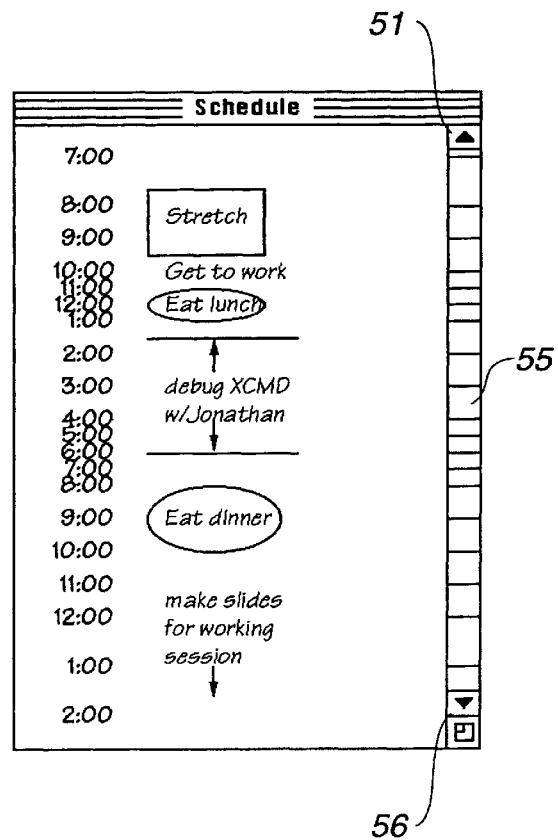

FIGS. 9 and 10 indicate the effects on a text document. FIG. 9 shows a day calendar 54 with a linear representation of time events from the hours of 8 a.m.–1 a.m. FIG. 10 shows the representation obtained in the invention. In this case, a vertical scroll bar 55 is at the right containing the usual scroll boxes 56 at top and bottom. In this case, the salient points as shown are determined by the user. The remaining times, being of less importance in this example, are shrunk temporally. No magnification of the salient times has occurred but now the range of times shown has expanded to 7 a.m.–2 a.m. The resultant non-linear representation is replicated in the scroll bar 55 by the density of the horizontal lines.

Figure 11:
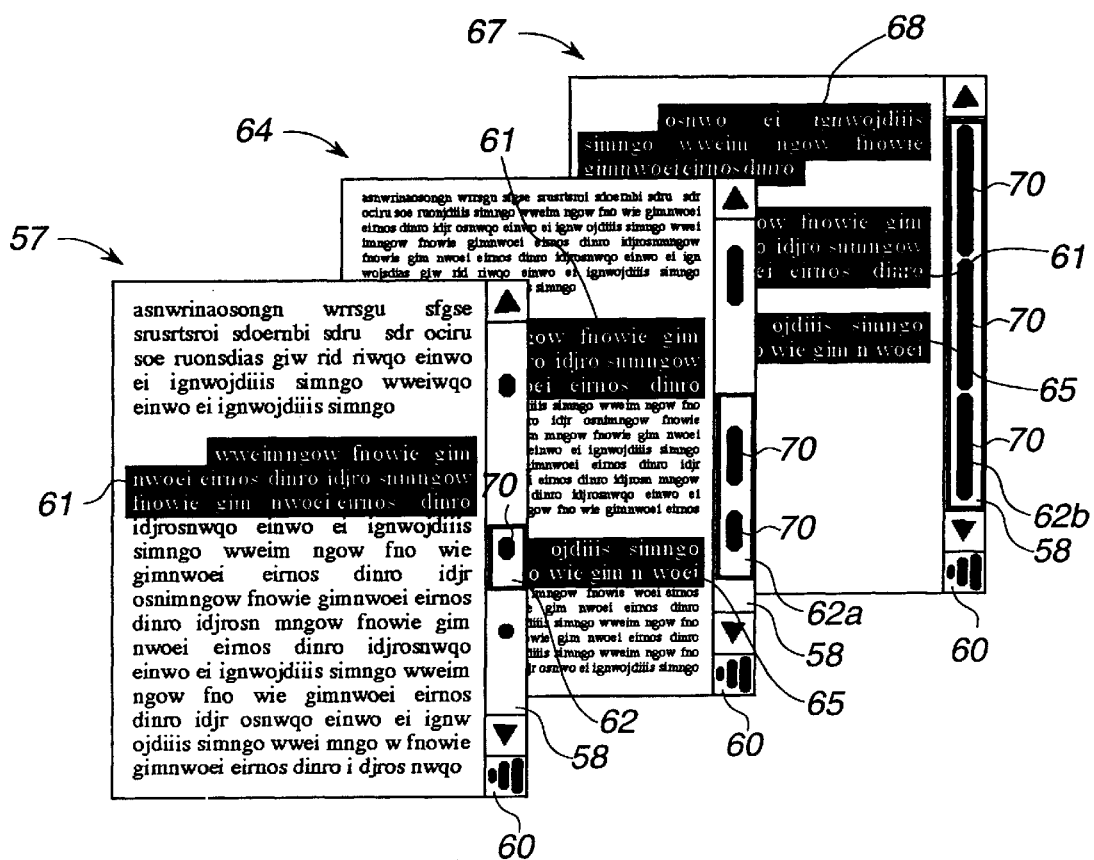

FIG. 11 shows another example of application of the invention to text documents. FIG. 11 depicts one page 57 of linear spatially depicted text, which would normally be displayed as a single screen with its accompanying vertical scroll bar 58 with, in this case, a relativity controller box 60. Three text lines have been highlighted 61 as salient. The thumb 62, it will be noted, has a certain size (height), showing as before one marked salient segment on the page. When the relativity controller box 60 is clicked on and dragged rightward (toward the right side of the mouse pad), reference numeral 64 now shows the resultant screen display. Note now that the non-salient (non-highlighted) parts of the original screen 57 have been shrunk or condensed, so that now not only the original marked segment 61 is visible but also a second marked segment 65. Note further that the thumb 62a has enlarged to indicate the increased number of visible salient points. Screen 64 also shows how the unmarked "insignificant" text above and below the salient segments shrink up, and disappear in the third screen 67 shown at the right when scaling perspective, as other salient segments 68 come into view. Thus, when the second screen 64 has segments 61,65 marked, and when the controller box 60 is clicked on and again dragged to the right, more of the succeeding text can be displayed as illustrated in the third screen 67. Again note the increased size of the thumb 62b. In all three cases, the scroll bar 58 illustrates at 70 the scope of the salient segments and thus the modified text representation. The text abstract generated 67 in this process could be presented in library search systems, so that the user could then more readily scan and expand the view to give more details as desired.

Figure 12:
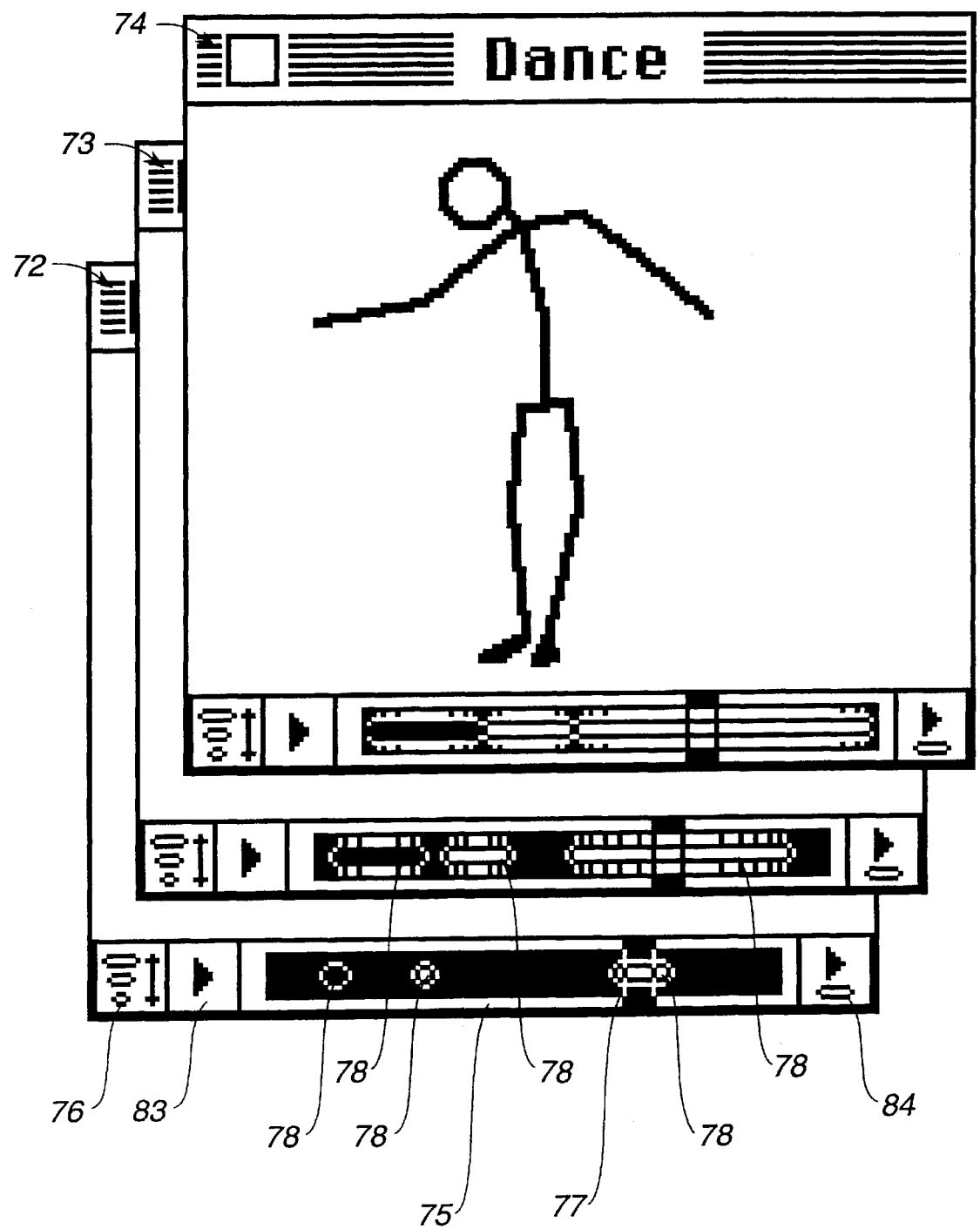
FIG. 12 shows various screen displays of video information produced by another form of the computerized system of the invention.
Figure 13:
FIG. 13 illustrates, schematically, various cursor shapes produced by a system of the invention.

FIG. 12 depicts application of the invention to video, for example, with Apple QuickTime video. QuickTime allows a user to play through a video presentation with a window just like playing a video tape on a VCR, except that QuickTime also allows editing of one or more of the frames making up the video. In this case, three successive screens 72, 73 and 74 are depicted, only one of which would appear at a time in the window. Each screen has its accompanying scroll bar 75 having a relativity controller box 76 at the left end, and a thumb 77 showing the temporal position of the video frame being displayed. Note also markings 78 displayed on the scroll bar 75 to represent marked segments. This figure and FIG. 13 also illustrates user control of the magnification. Note that the relativity controller box 76 also shows different sized scroll representations to inform the user of its function. In this example, when the user clicks on the controller box 76, a cursor 80 is displayed on the screen. While holding down the mouse button, when the user moves his or her mouse upwards, represented by image 82 (which is not actually displayed) the cursor 80 appearance changes with a larger white space region 81 to indicate higher magnification. During the movement, which is reversible—up for increased magnification, down for reduced magnification—, only one cursor image 79 is displayed, the full line image, representing the selected magnification level. The other grayed images are not displayed. When the user releases the mouse button, the selection of the magnification level is completed and may be stored with the data structure representation of the video if desired. In this instance, seven discrete levels of magnification are possible, but the invention also contemplates continuous change in magnification level. In the latter case, it is preferred to display a slide control with button, movable by the user to select the desired magnification level such as is used in the Macintosh volume control.

Note further, in FIG. 12 how the user's marked segments 78 of video get longer and the scroller (above and below mark) gets lighter as the spacing between marks condenses and darkens when the user scales perspective by moving the mouse upwards, toward the top of the mouse pad. Also, note how the scroll bar appearance changes to reflect the size of the marks in relation to the length of the whole video.

Marking of the video can occur in the same manner as the audio, such as pressing a mouse button when the cursor is on the video to mark the beginning of a segment and releasing the button to mark the end of the segment. The resultant marks can be displayed on the video, or in the scroll bar, or on both.

In this aspect of the invention, not only is the user allowed to select and display the scope of salient segments, but as a further feature allows the user to vary the degree of magnification of the salient segments. It will also be understood that, besides size, other scroll bar changes can be used to represent the salient segments and/or different levels of magnification. For example, different colors can be used to represent on the scroll bar the salient and non-salient segments selected at different times or by different users, and if desired the intensity of the color used to illustrate level of magnifications.

Figure 14:
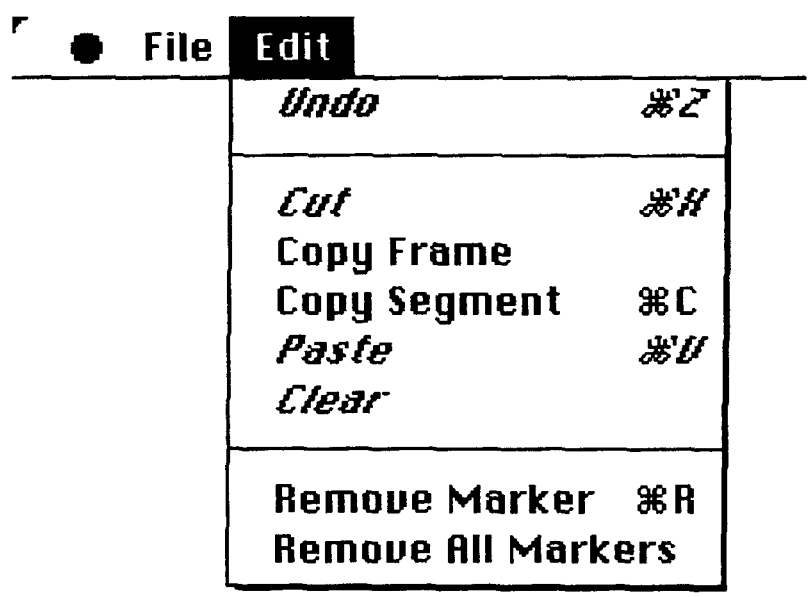
FIG. 14 shows a screen menu that can be used with the system of the invention.
Figure 15:
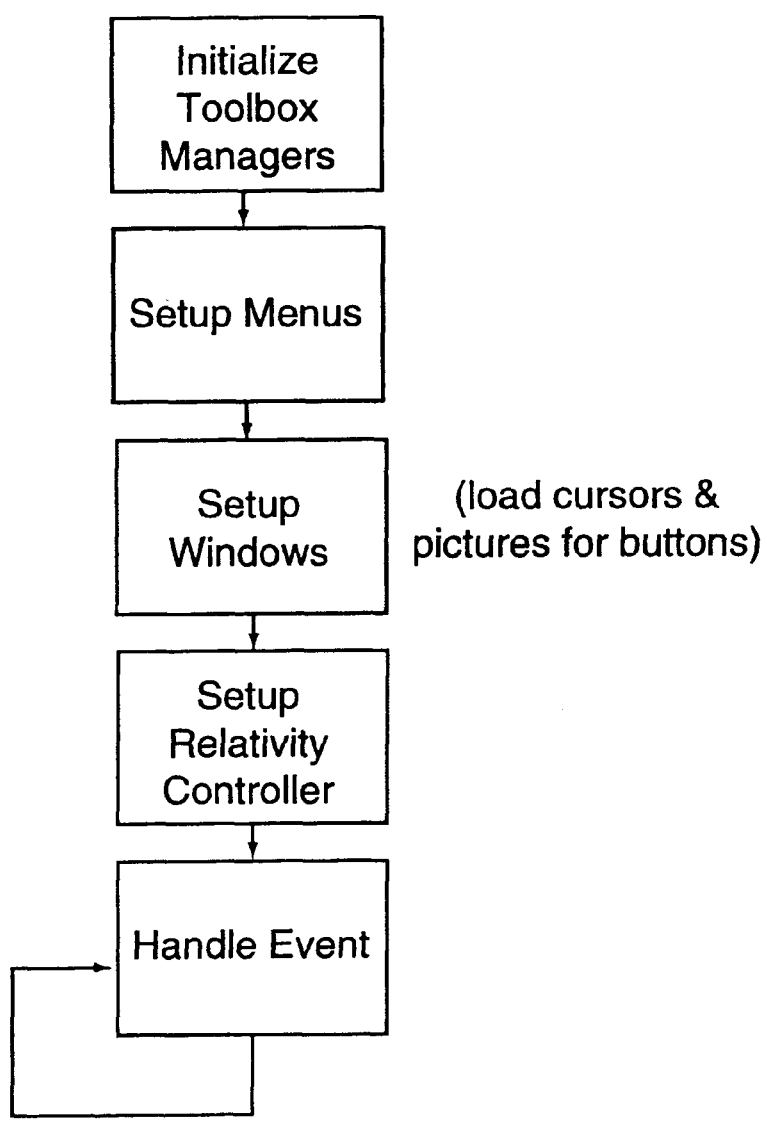
FIGS. 15–33 are flow charts for implementing one form of computerized system of the invention.
Figure 16:
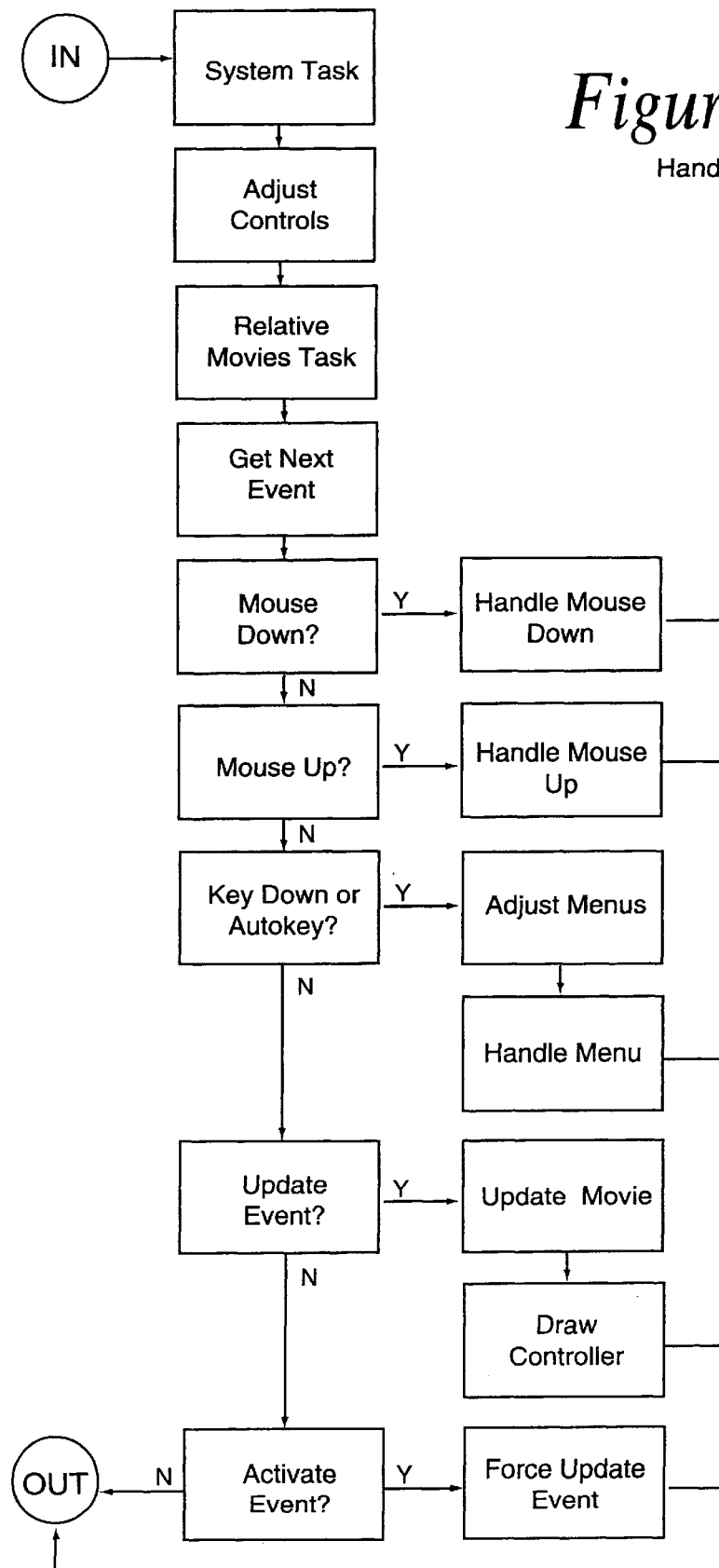

The relativity controller application program will not interfere with the normal functions available in programs such as Apple QuickTime, while providing the additional functions described above. A listing of available functions for a preferred embodiment, which is not meant to be limiting, appears below, to be used with, for example, an EDIT menu as depicted in FIG. 14.

The edit menu allows the user to perform the normal functions on displayed information, as well as the ability to remove any marks made by the user on the screen display or the scroll bar. what appears below is a description of functions available to the user to carry out the invention. One way of implementing these functions in software are shown in the program flow charts illustrated in FIGS. 15–33. The functions included are for the video of FIGS. 12 and 13, but obviously can be modified and applied to audio or text. Also, in the description of these button functions, the relativity controller has also been referred as the scale perspective button.

Adjust position in movie time
        click or drag mouse in scroll bar
    Play & Pause movies from/to anywhere in movie
        (beginning<-> end)
        press Play/Pause button
    Mark segments of movies (while playing or paused)
        press mouse (and hold down for duration of mark) within movie window
    Review individual marked segments
        click on a mark, and press Play Segment button
    Adjust relationship between marked and unmarked segments
        click on Scale Perspective button and drag mouse vertically (up into movie-> relative scaling; down out from movie-> absolute scaling)
        option-click on slider thumb and drag mouse vertically (one step navigation to/from specific point in time & resolution)
    Remove 1 or all marks in movie
        click on a mark, and select Remove Marker (cmd-R) from Edit Menu
        click on a mark, gesture (press, drag, lift) left with mouse within mouse within movie window
        select Remove All Markers from Edit Menu
    Change current marking color
        use Apple 'Color' control panel to choose Selection Color (may facilitate collaboration of groups of people (diff. color per person))
    Copy frames or marked segments to the Macintosh clipboard & other applications
        select Copy Frame or Copy Segment (cmd-C) from the Edit Menu
    Save document marks and perspective
        select Save (cmd-S) from File Menu
    High Speed annotation:
        adjust Scale, press Play, then mark segments
        can also be used by scaling to fast-forward to stop when hits a marked segment.

As is conventional in the Macintosh, the left button 83 (FIG. 12) on the scroll bar represents the play button which then converts to pause during play. The right button 84 can thus be used by clicking as a play segment or play mark button.

Various features of the invention as well as modifications are also indicated below:

Marks can be drawn inside scroll bar to keep desktop real estate usage down
    Marks can be colored to indicate different users or states of notation
    Scale Perspective cursor changes (while adjusting scale) to reflect size of segments in scroller (also dynamically changing)
    Relationship between marked and unmarked segments is reflected in:
        speed of playback (unmarked segments speed-up with perspective relativity)
        size of marks in scroll bar (unmarked segments shrink in proportion to play speed) (marked segments enlarge to fill the remaining scroll bar space)
        color of scroll bar area: indicating density of scale (looks like depth of field) (unmarked segments get darker in proportion to size in scroll bar & speed) (marked segments get lighter in proportion to size in scroll bar)
    At more relative scale, user has higher resolution access to time in that area (moving scroll thumb passes through less frames per pixel)
    Overlapping marked areas join to form single marks (with 1 scope & 1 color if desired)
        if new mark falls between original startTime and endTime, then newColor=¼ (new)+¾ (orig.)
        if new mark overlaps original startTime or endTime, then newColor=(orig.+new)/2
        if new mark overlaps both original startTime and endTime, then newColor=¾ (new)+¼ (orig.)
    'Save' menu item is enabled when user modifies marks or scale (perspective is part of the document)
    Marks & scale are saved inside movie files as QuickTime 'user data' Mark data consists of scope (startTime, endTime) and color when chosen (RGB)
    Gives audio feedback when removing marks from segments
    Marked movies have unique 'stamped movie' icon on Desktop Also listed below is a summary of a few data types with examples of how the invention can be applied:

| DATA TYPE: | APPLICATIONS: |
|---|---|
| Schedules | personal profile based time scaling |
| Sound | annotation & editing |
| Video | annotation & editing |
| Text | data retrieval & abstract searching |
| CAD & PICT | scaling space to dimensions of experiential perspective |

Implementation of the various forms of the invention will be evident to those skilled in the art. Reference is made to "Inside Macintosh", (published by Addsion-Wesley) which provides the code for developers for various kinds of interface constructs, such as scroll bars, control bars, slide controls, and boxes used therein, as well as how to display them in different colors or appearances, and how to invoke program routines when a user clicks on a box or icon, and how to change the appearance of an icon-when a routine is executed. See, also, U.S. Pat. No. 4,931,783, which describes operation of a system with the Apple Graphical User Interface, whose contents are herein incorporated by reference.

To further assist those skilled in the art, FIGS. 15–33 are flow charts of one form of program suitable to implement a user selecting and displaying in accordance with the invention desired salient of a video presentation.

Figure 17:
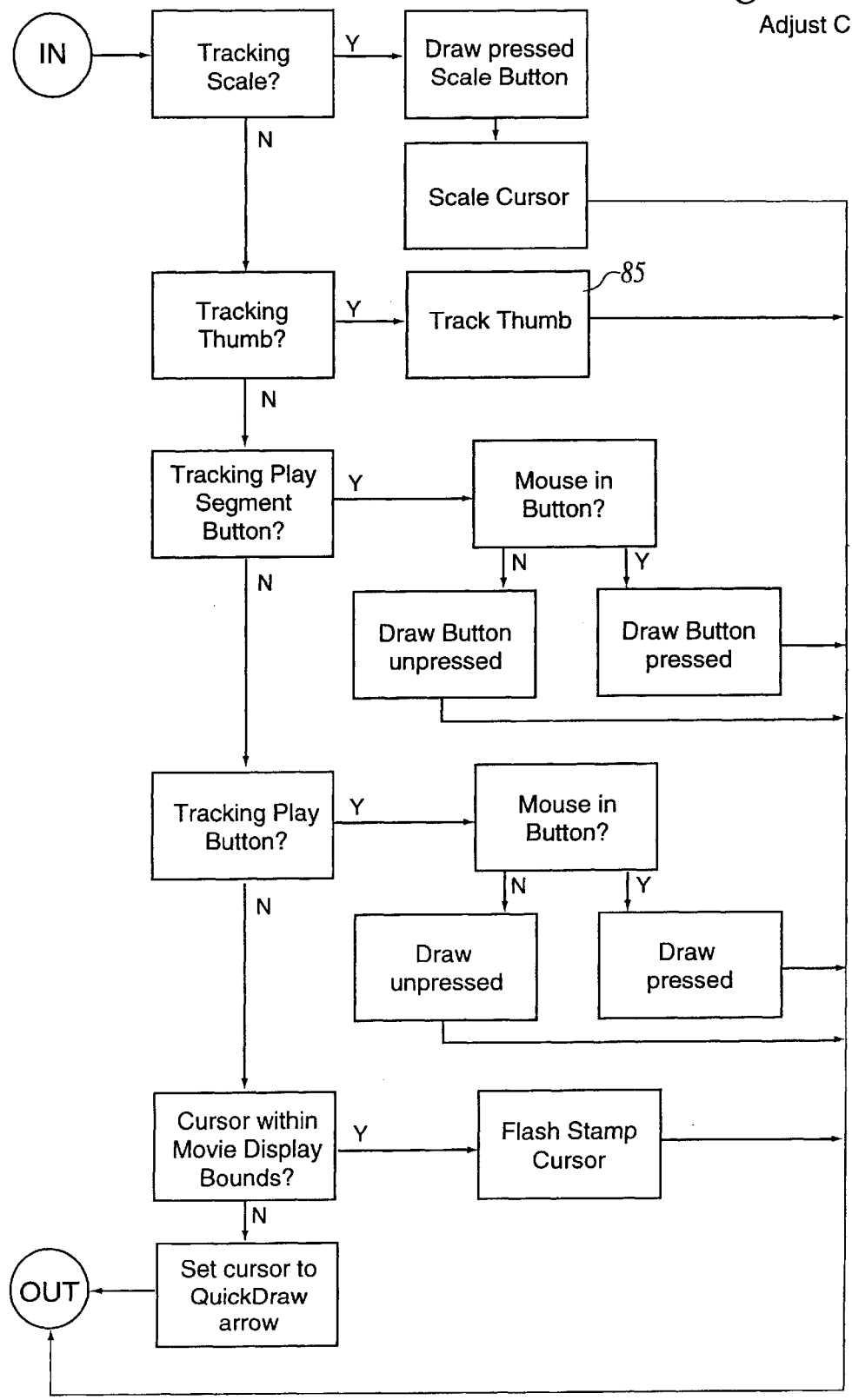
Figure 18:
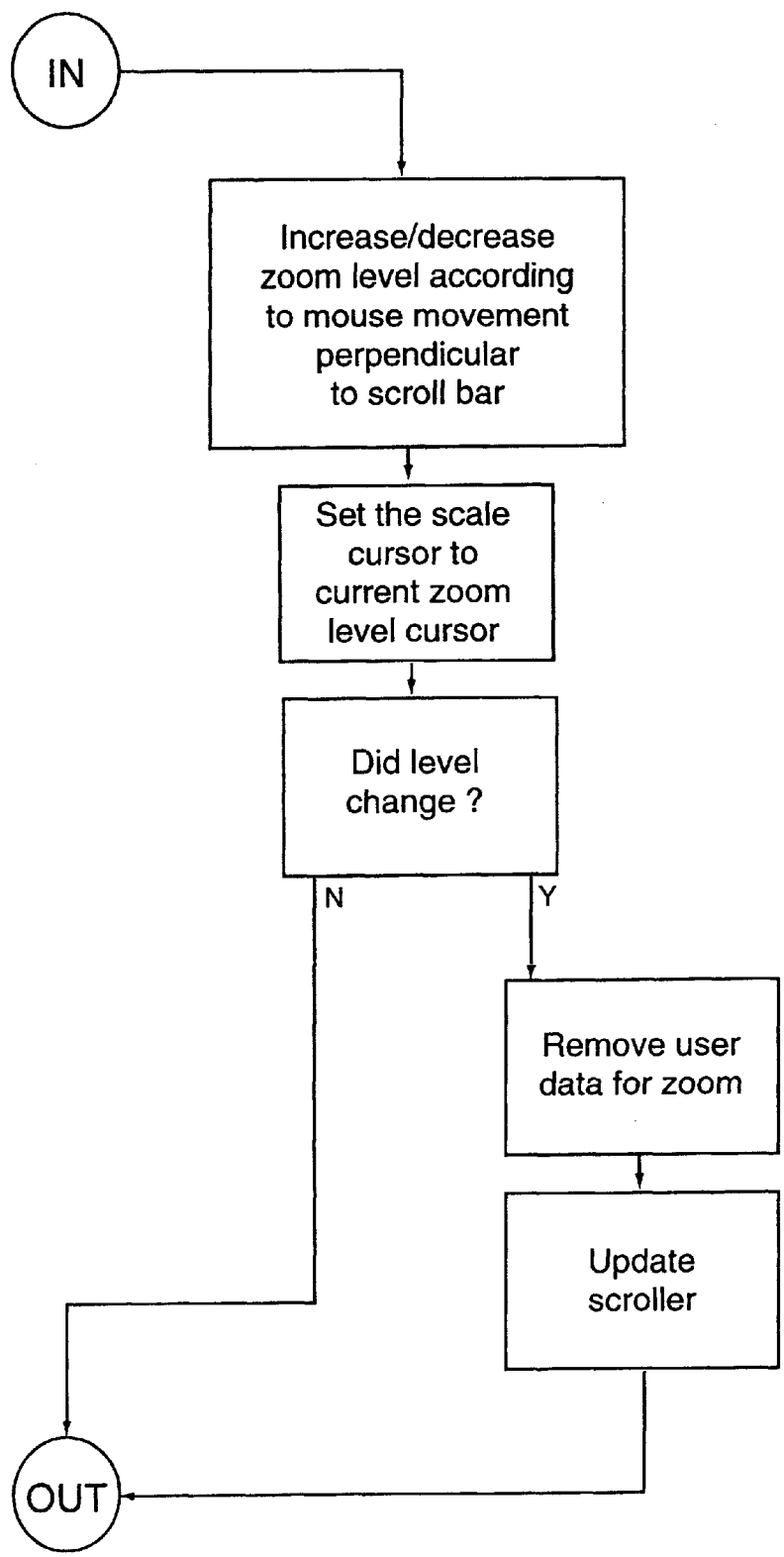
Figure 19A:
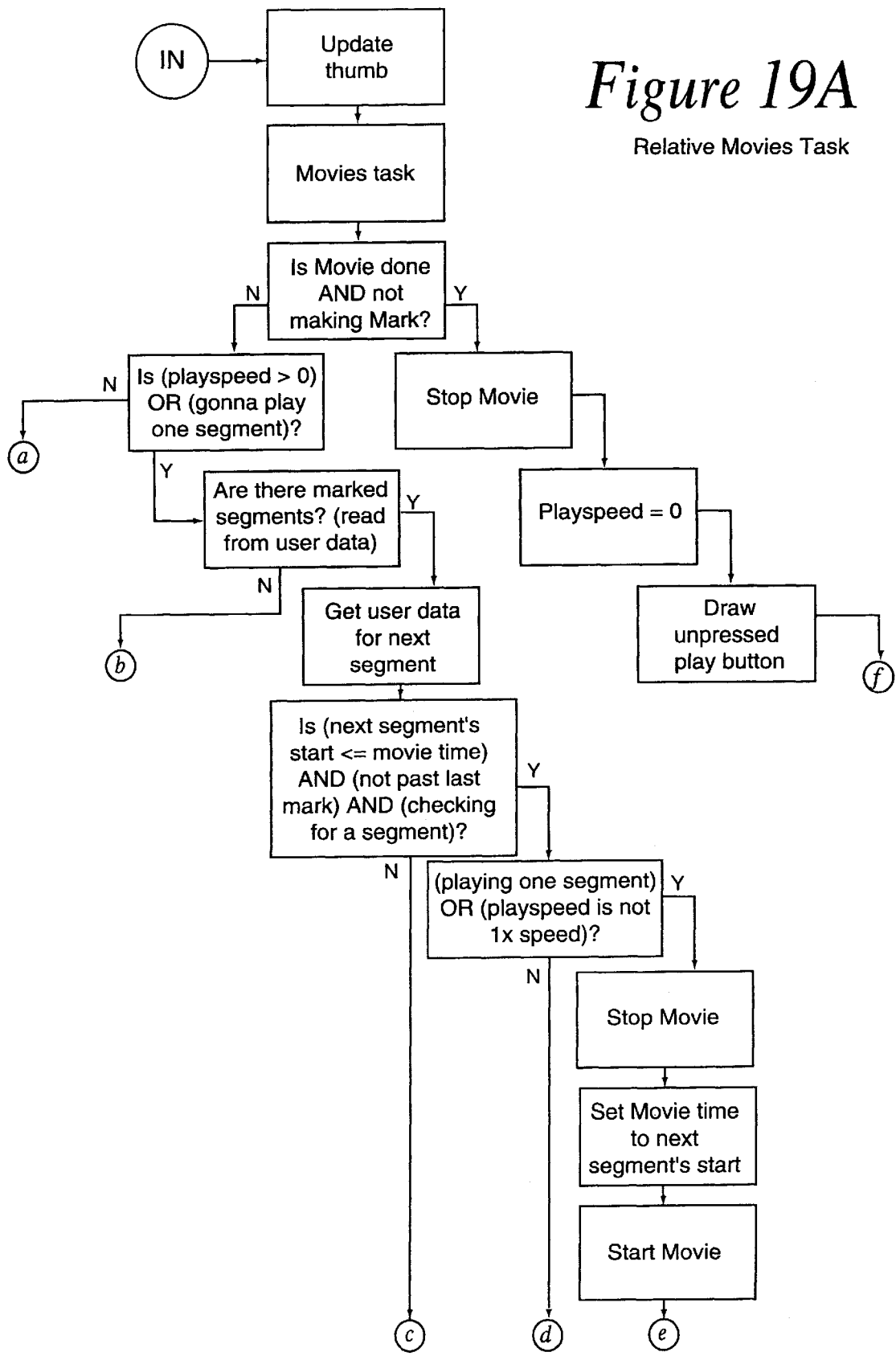
Figure 19B:
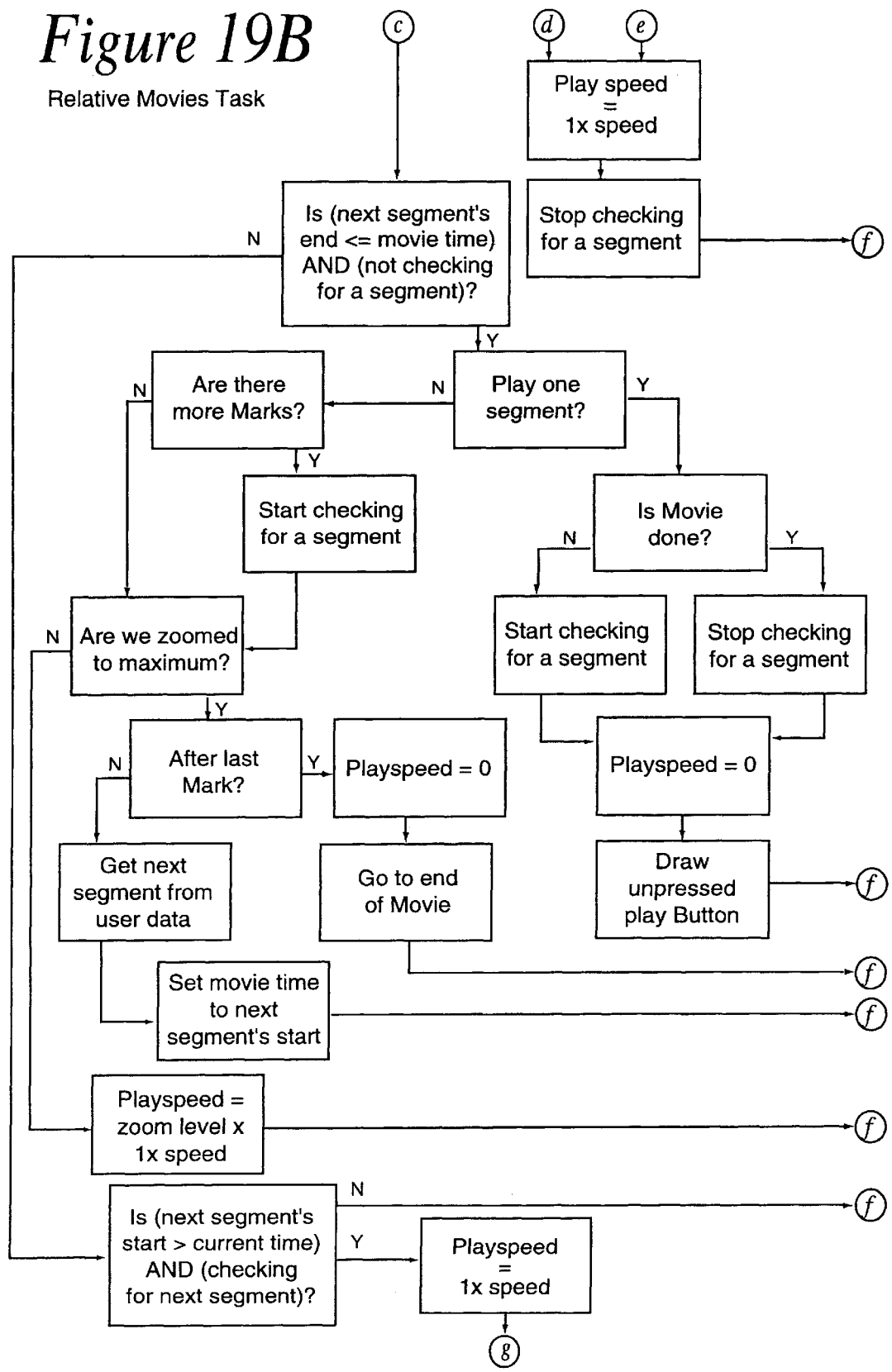
Figure 19C:
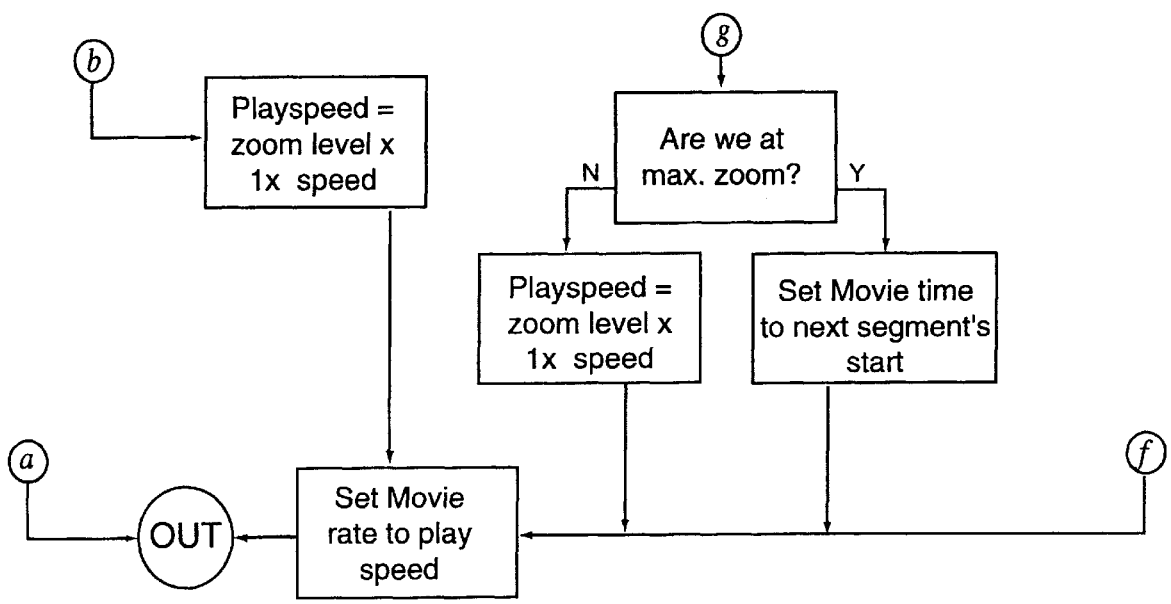
Figure 20:
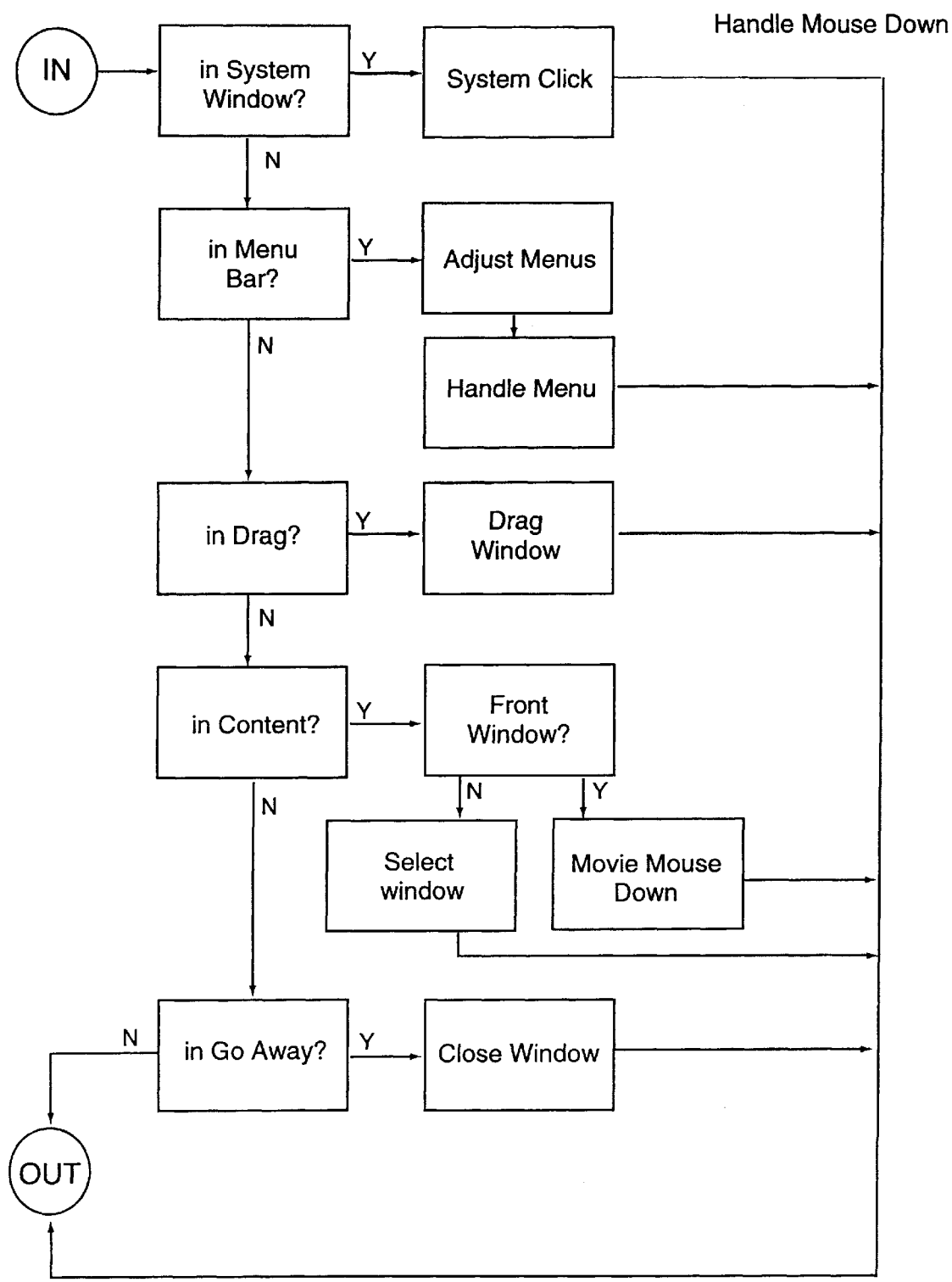
Figure 21:
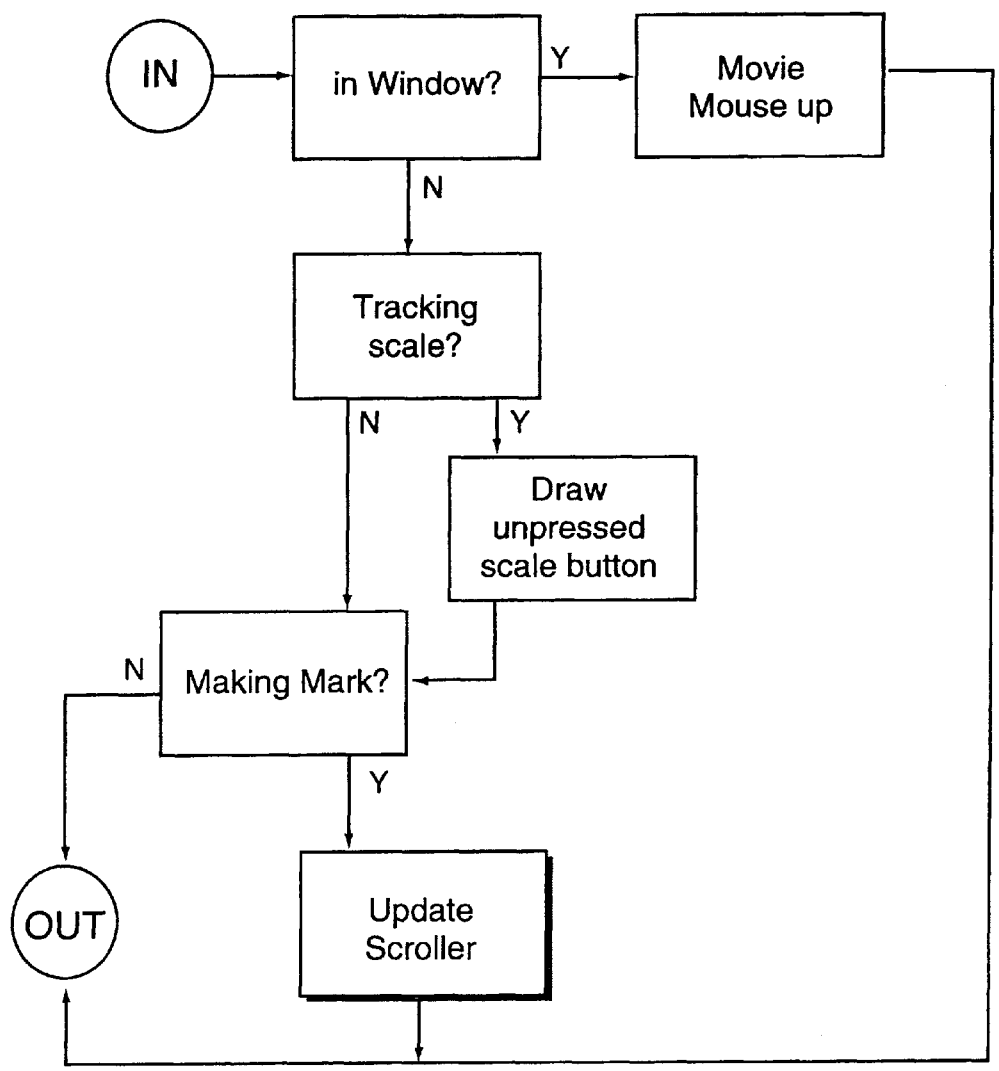
Figure 22:
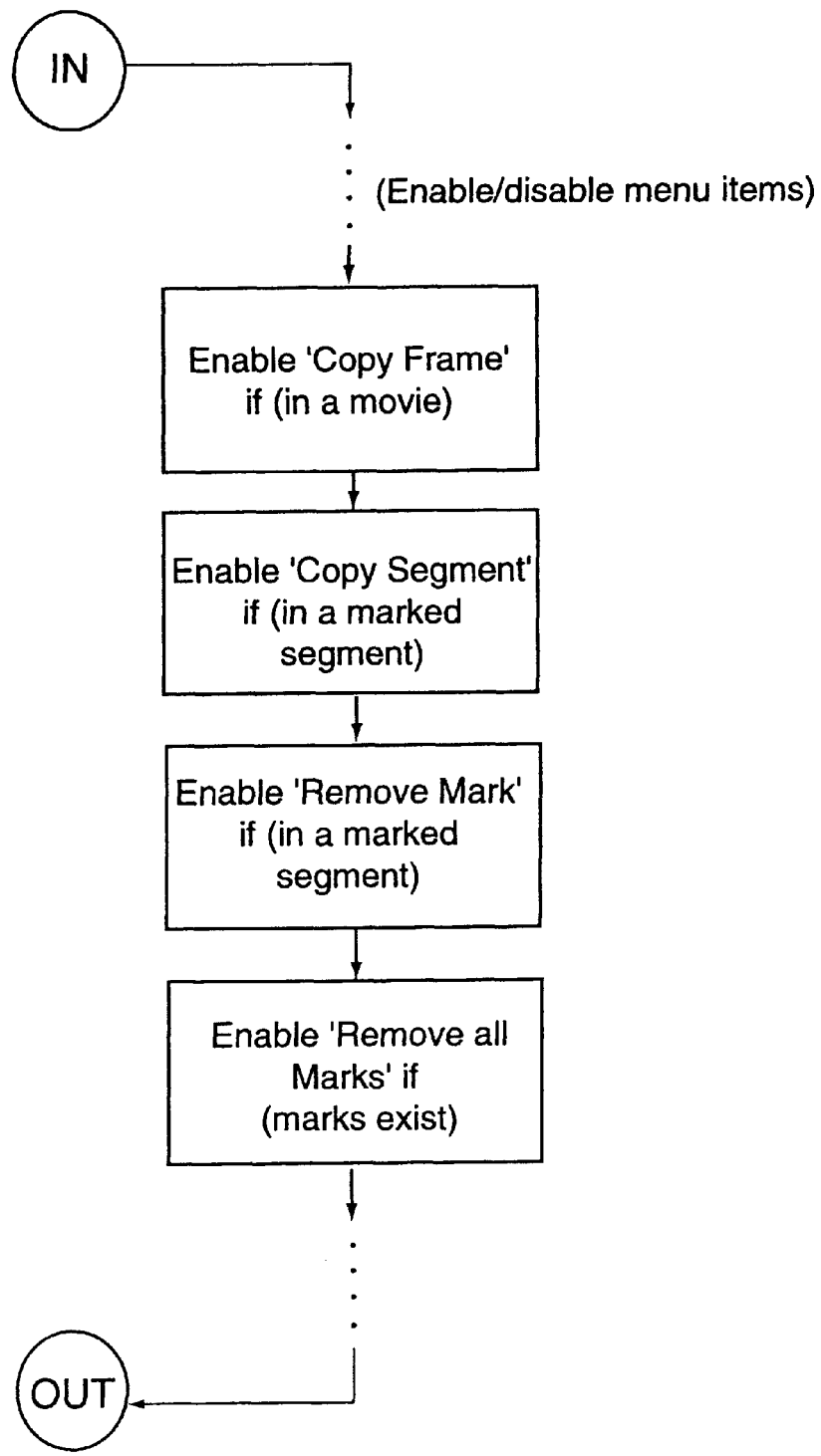
Figure 23A:
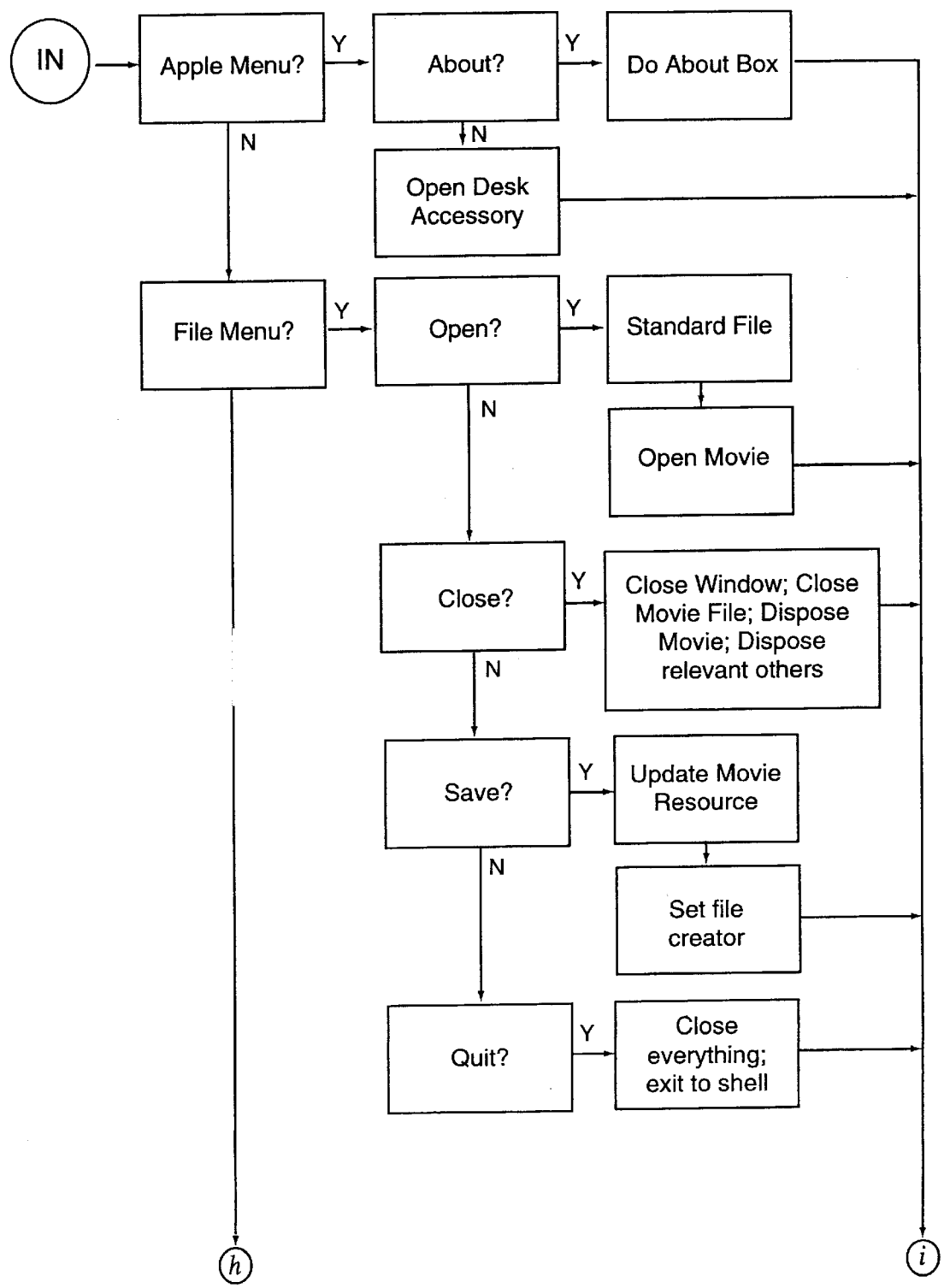
Figure 23B:
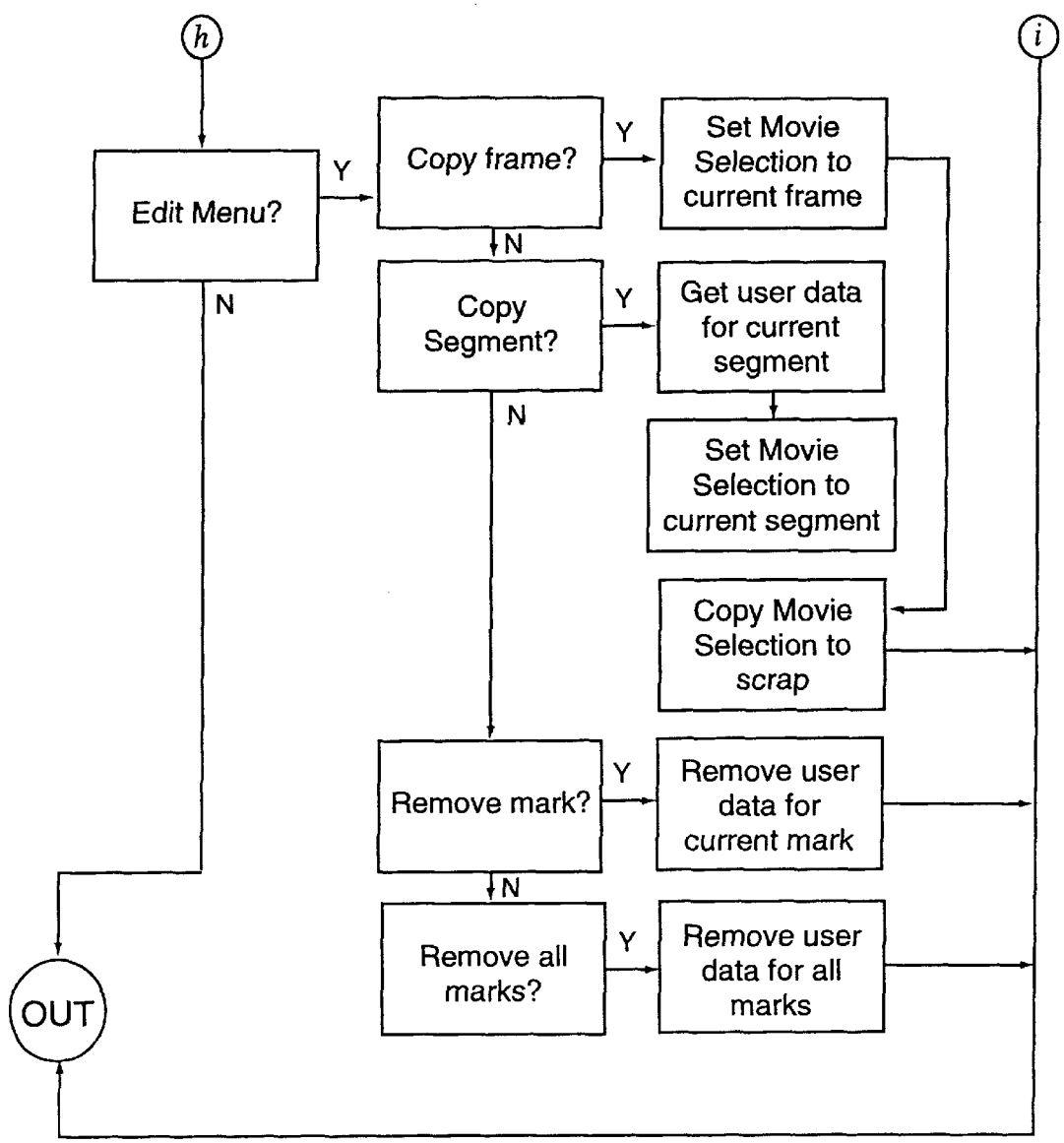
Figure 24:
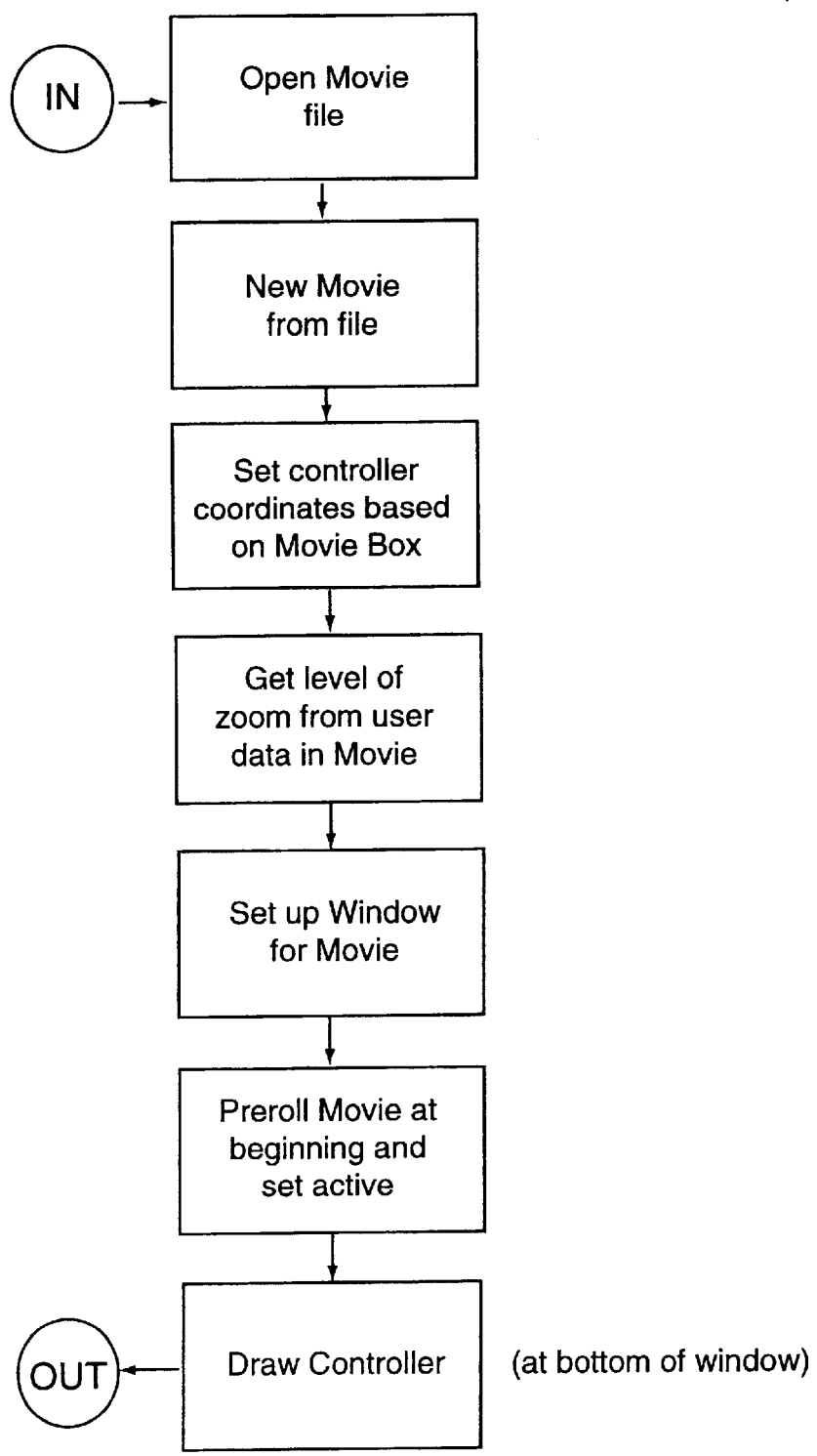
Figure 25:
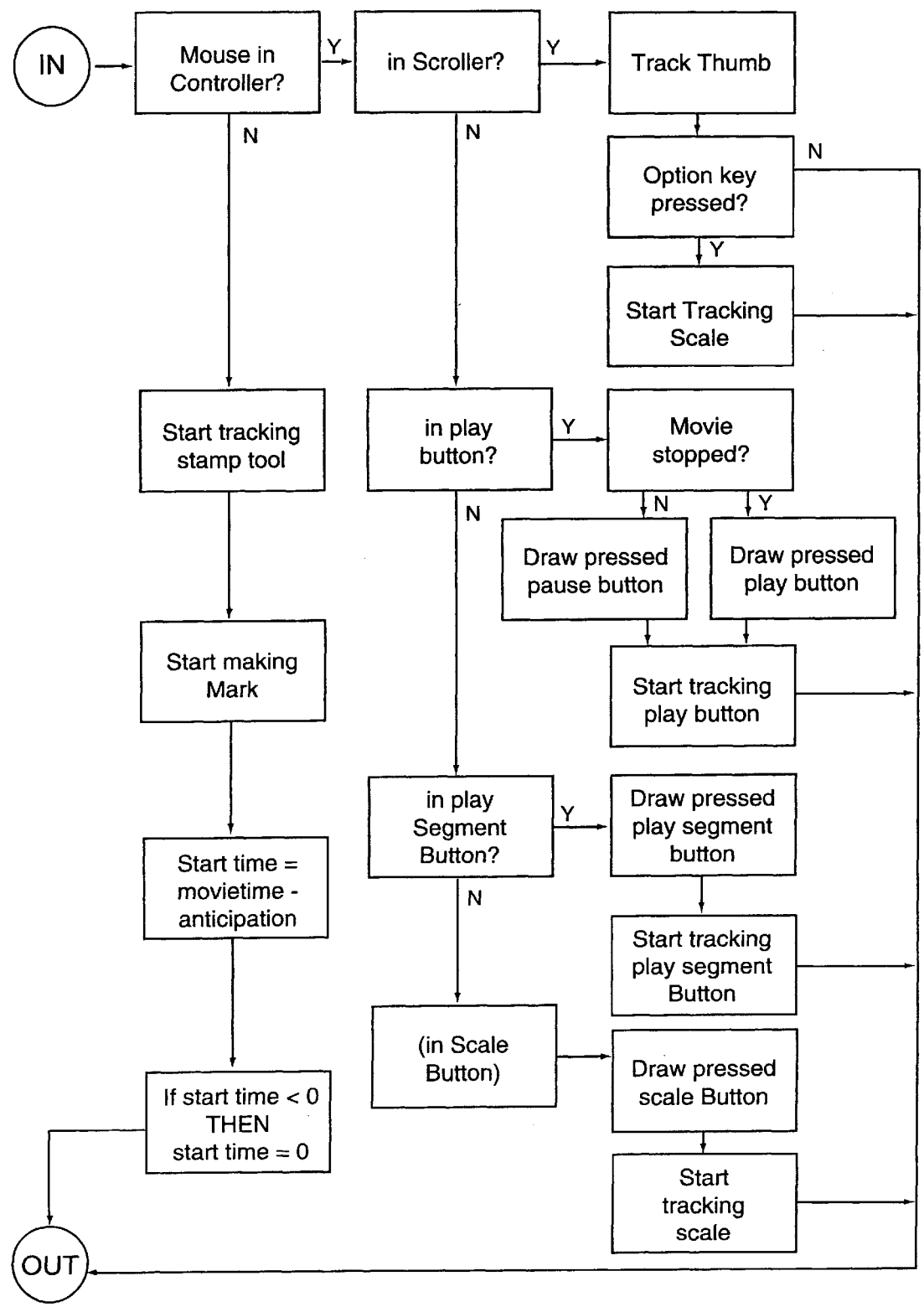
Figure 26A:
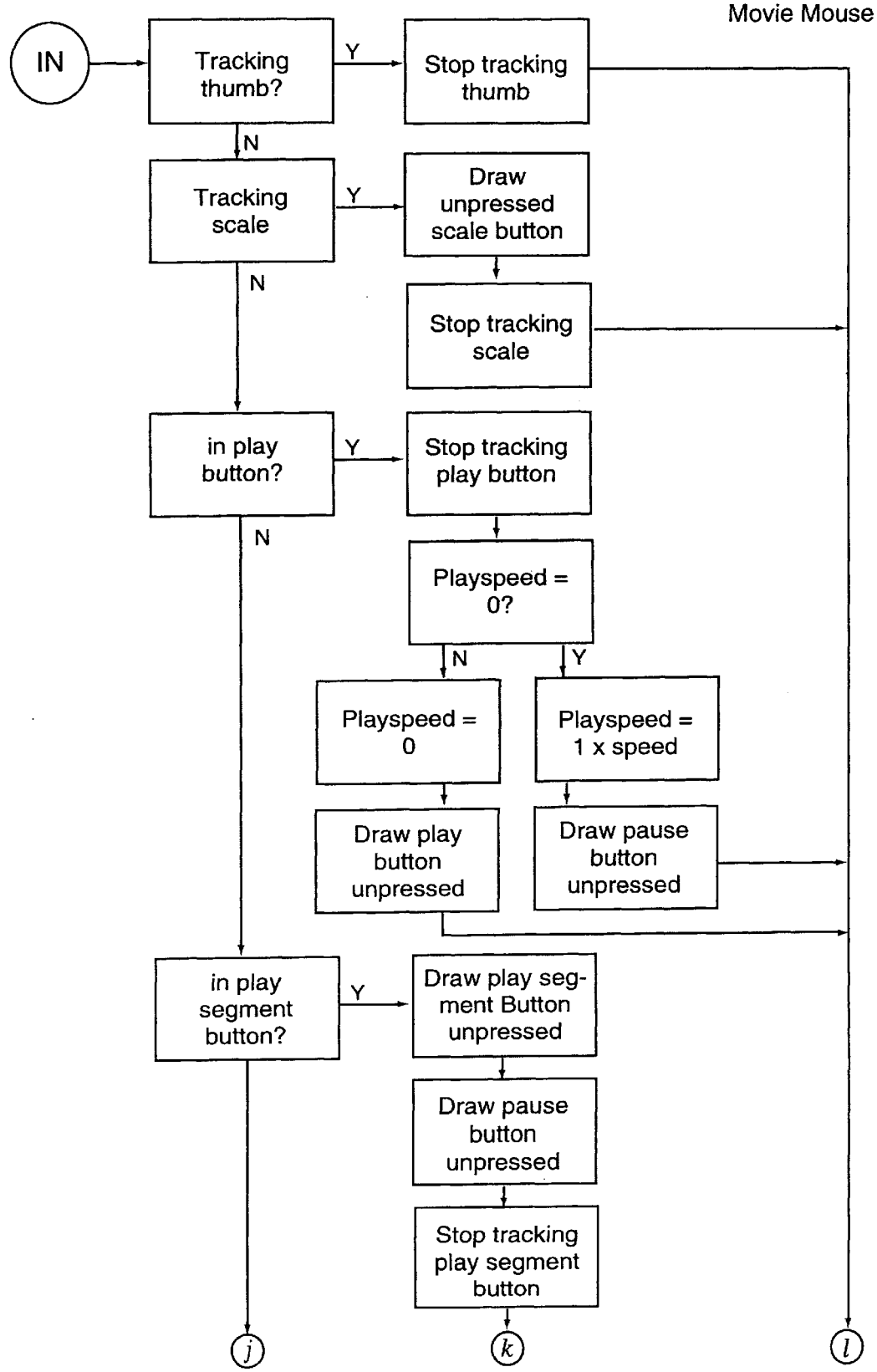
Figure 26B:
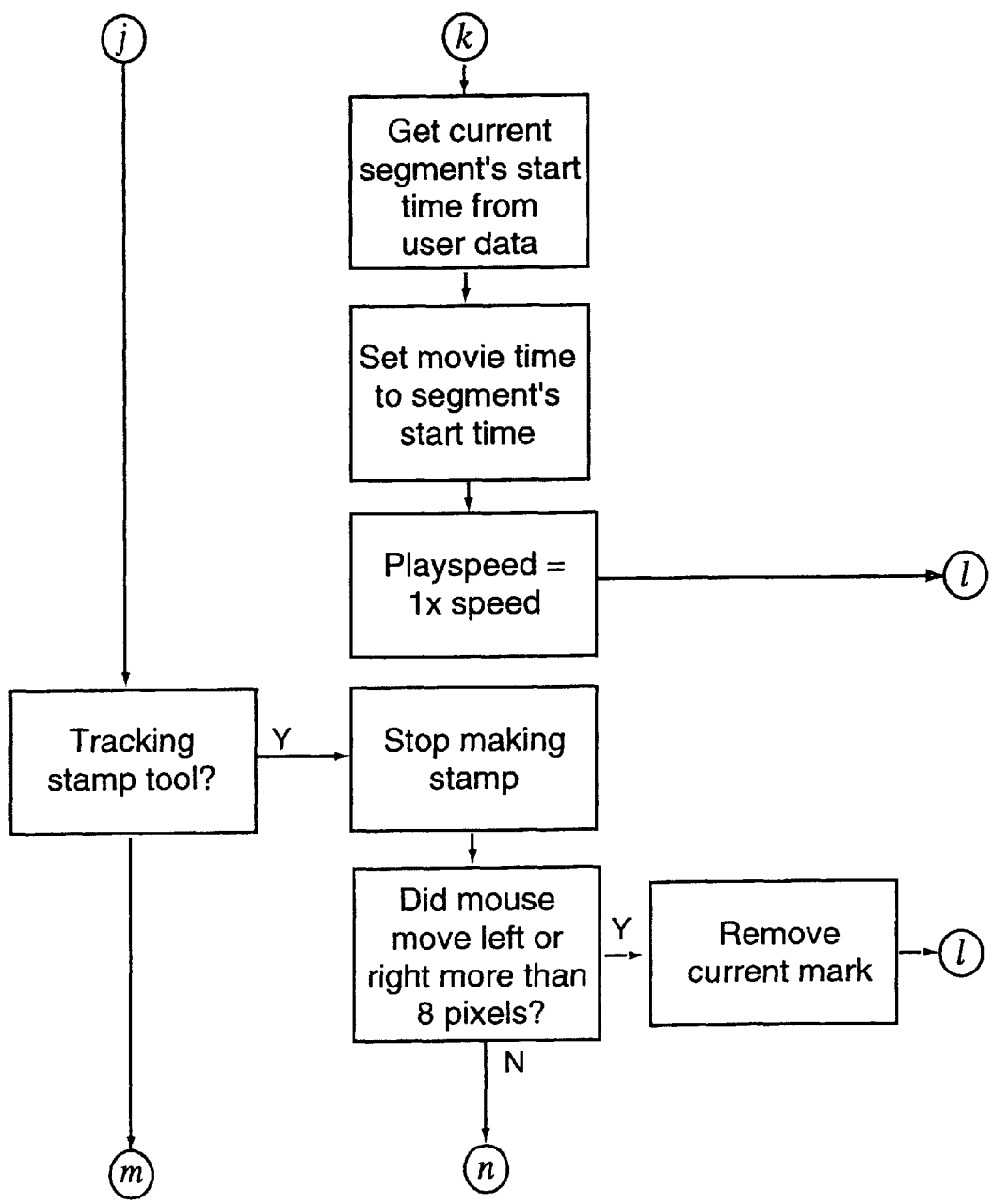
Figure 26C:
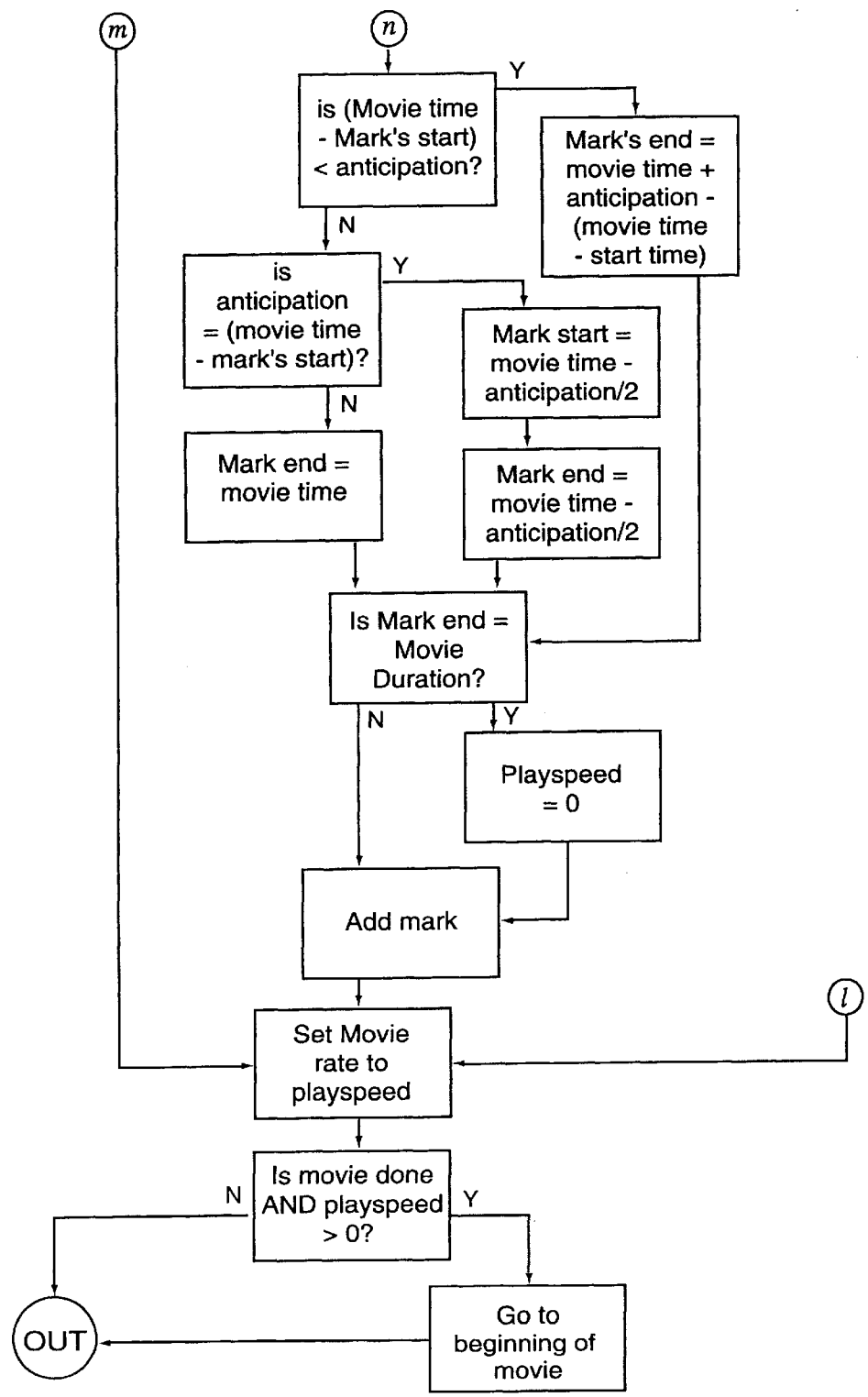
Figure 27:
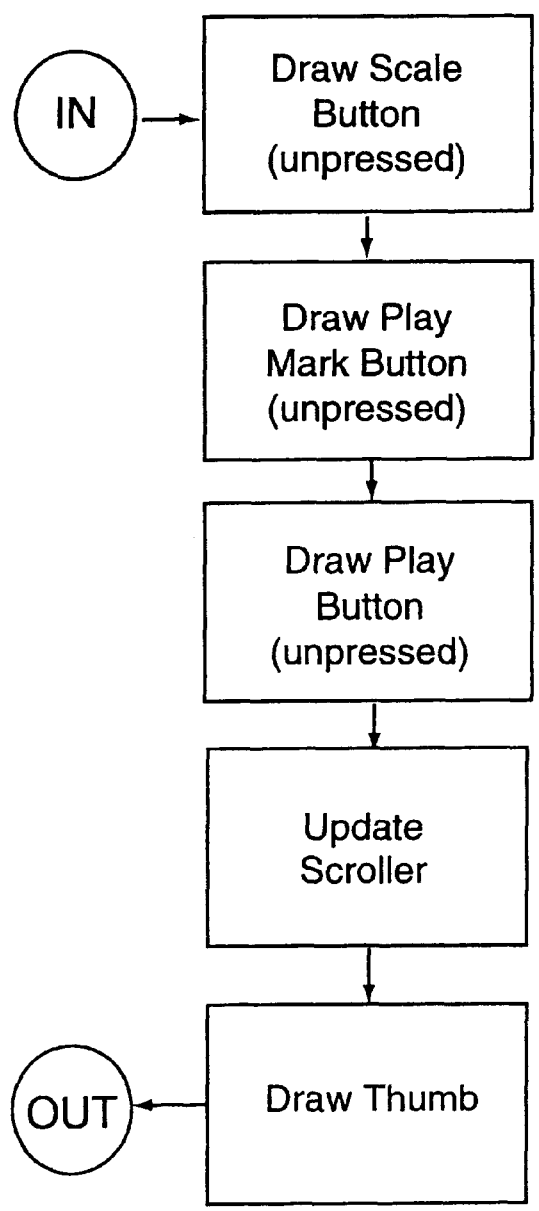
Figure 28A:
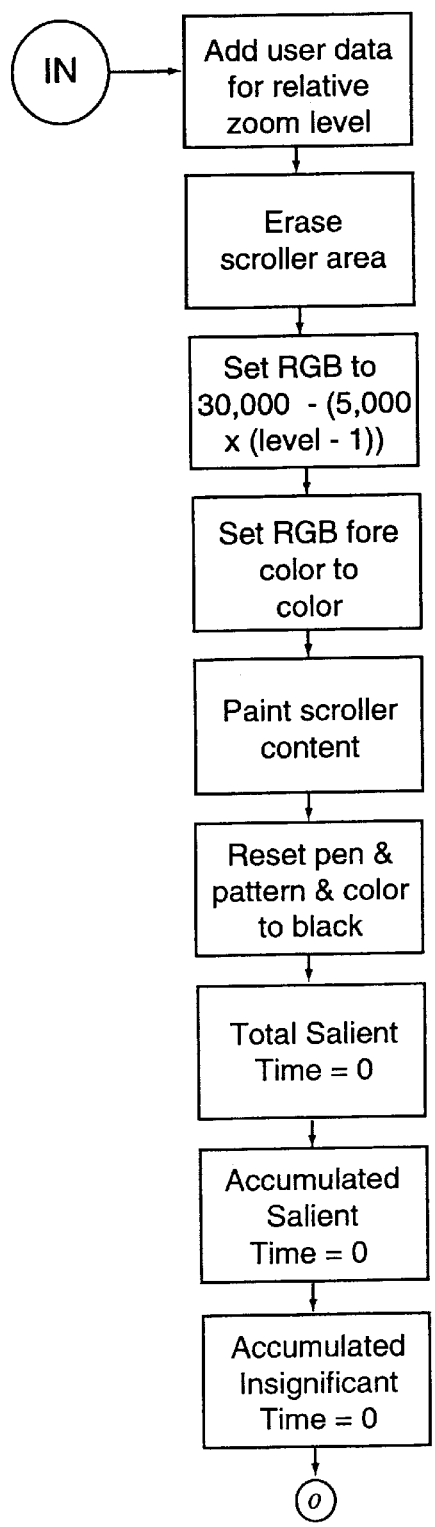
Figure 28B:
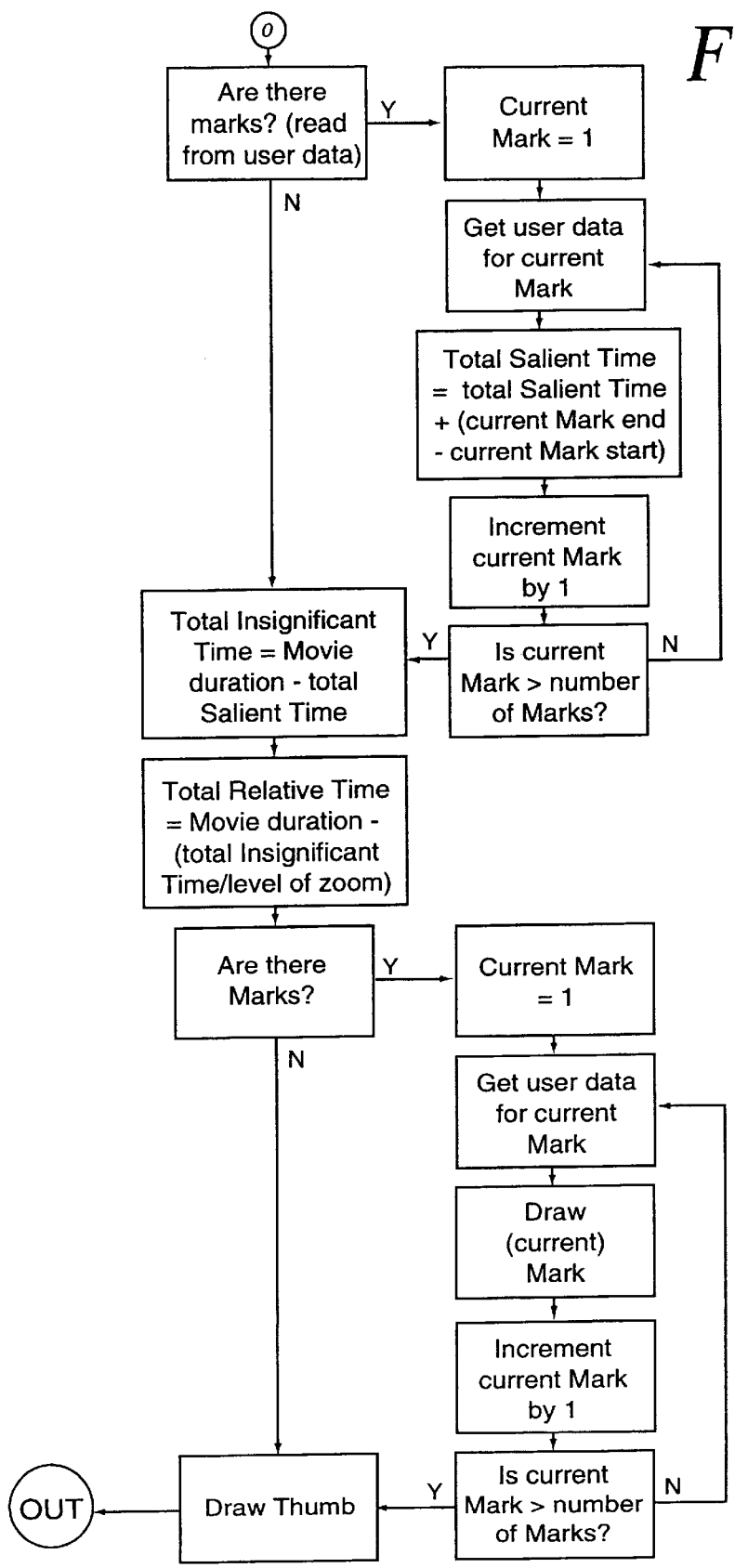
Figure 29A:
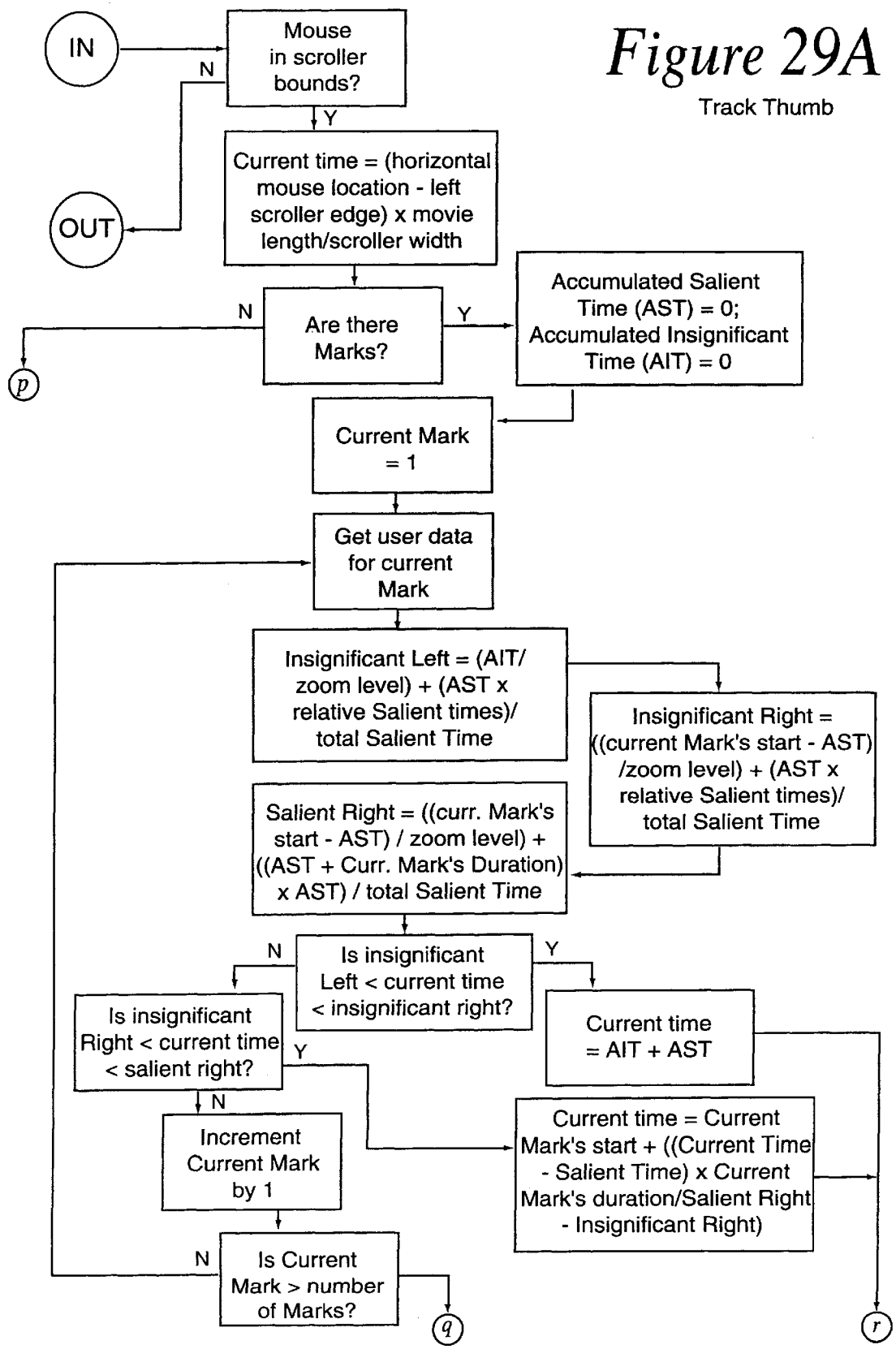
Figure 29B:
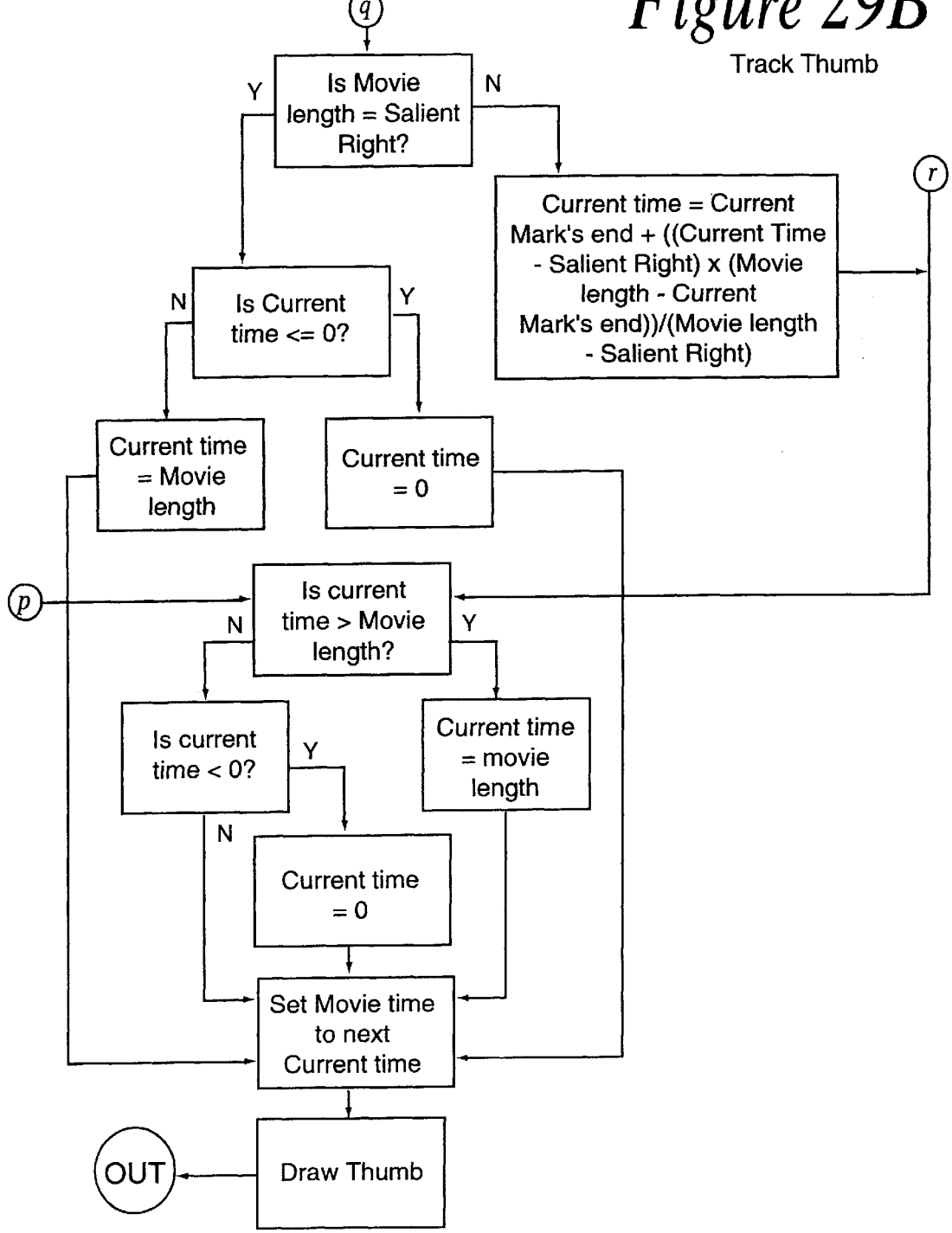
Figure 30A:
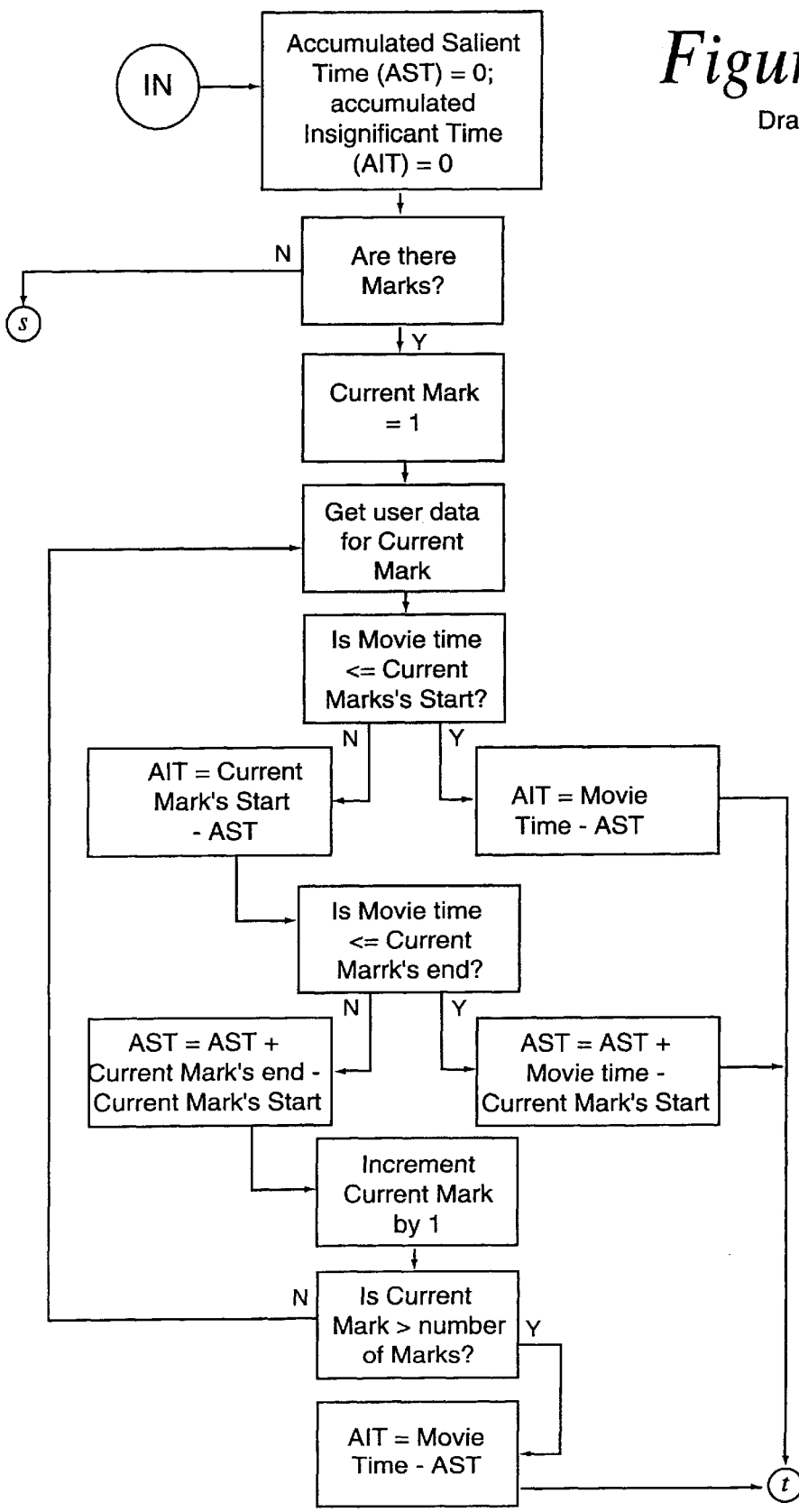
Figure 30B:
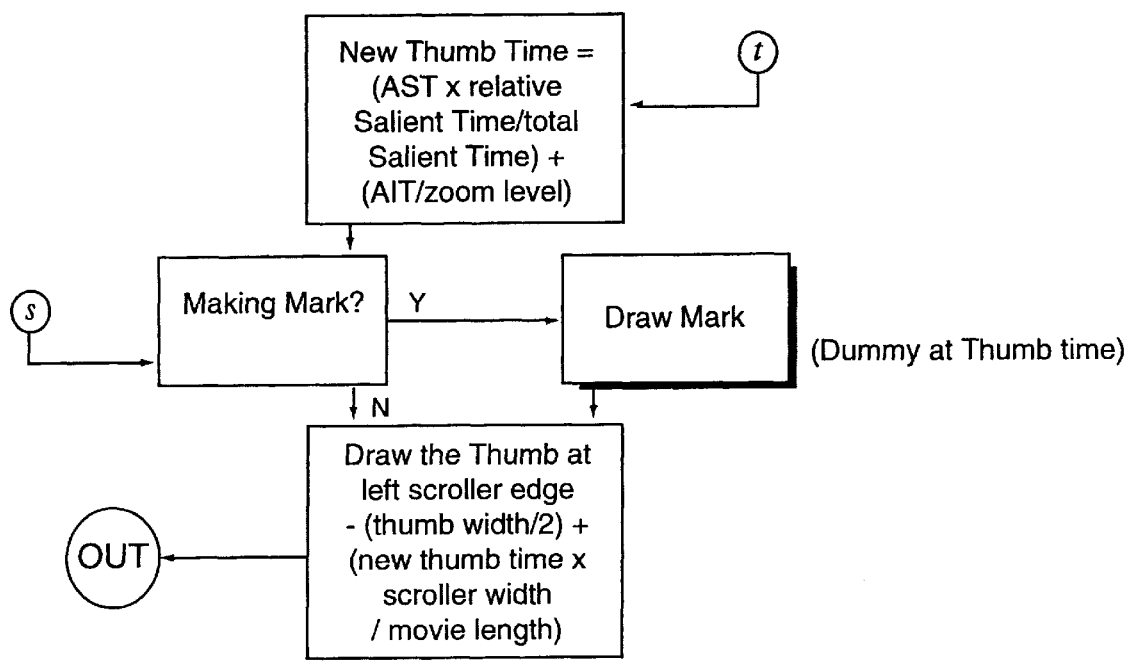
Figure 31A:
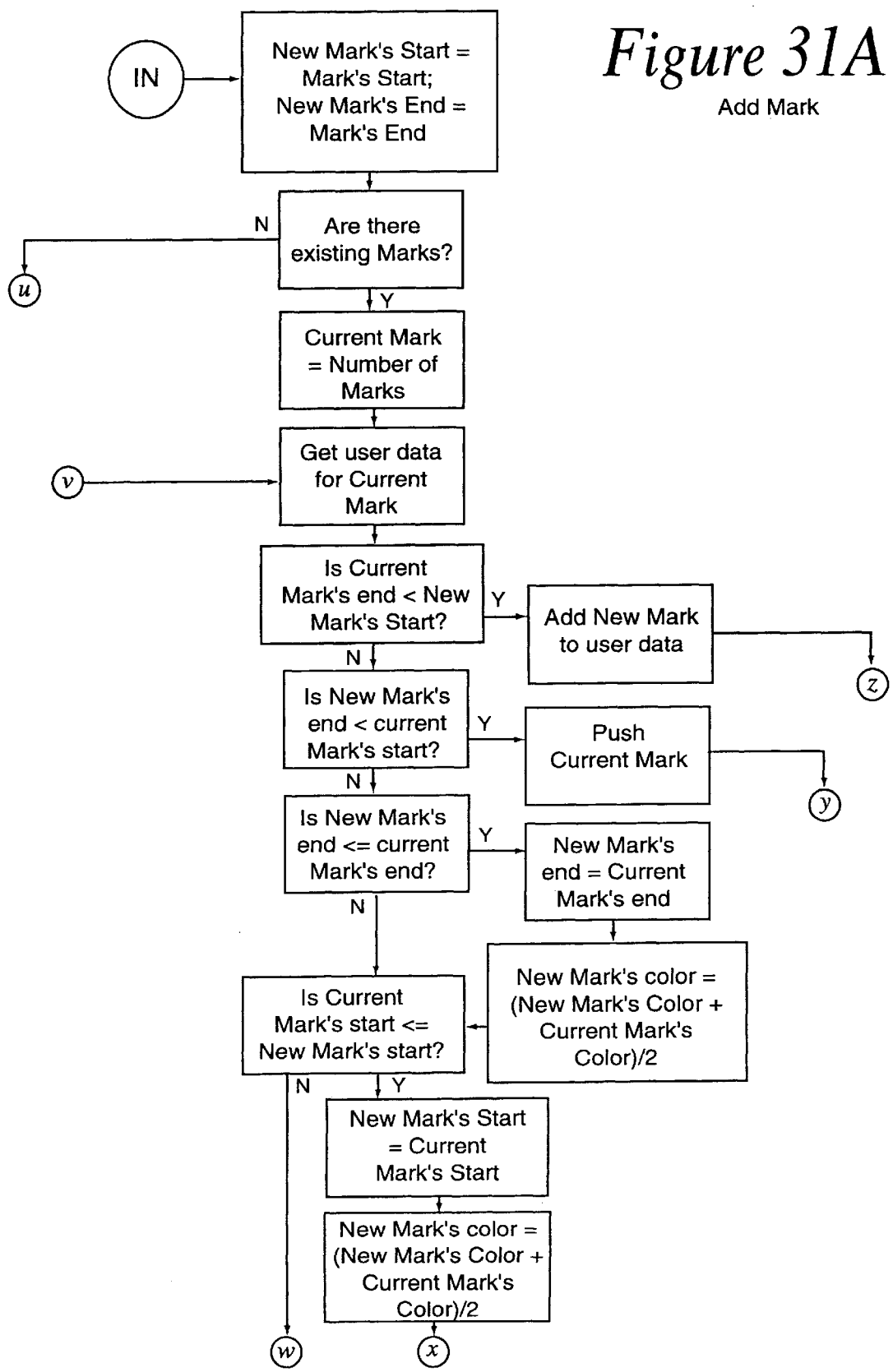
Figure 31B:
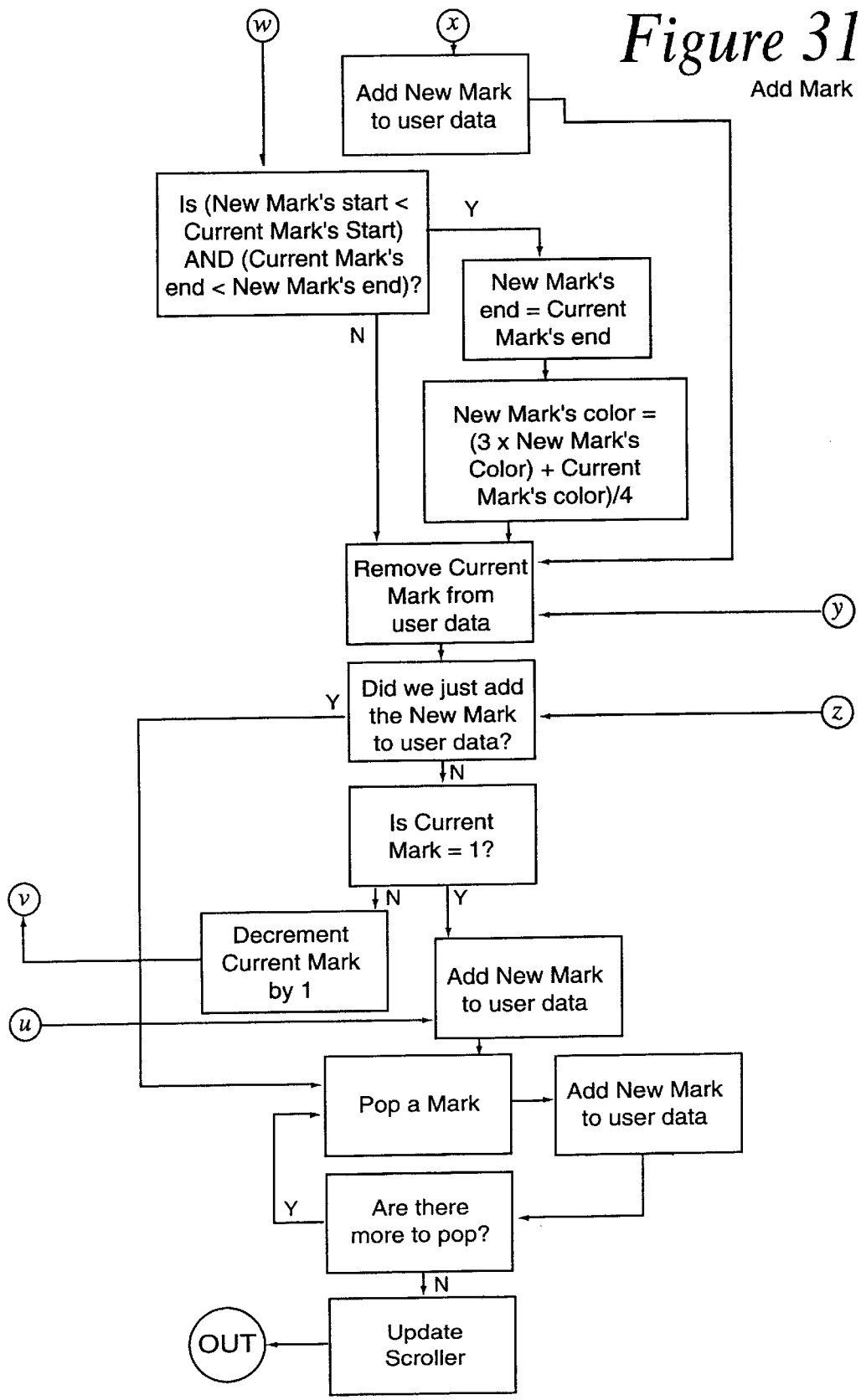
Figure 32A:
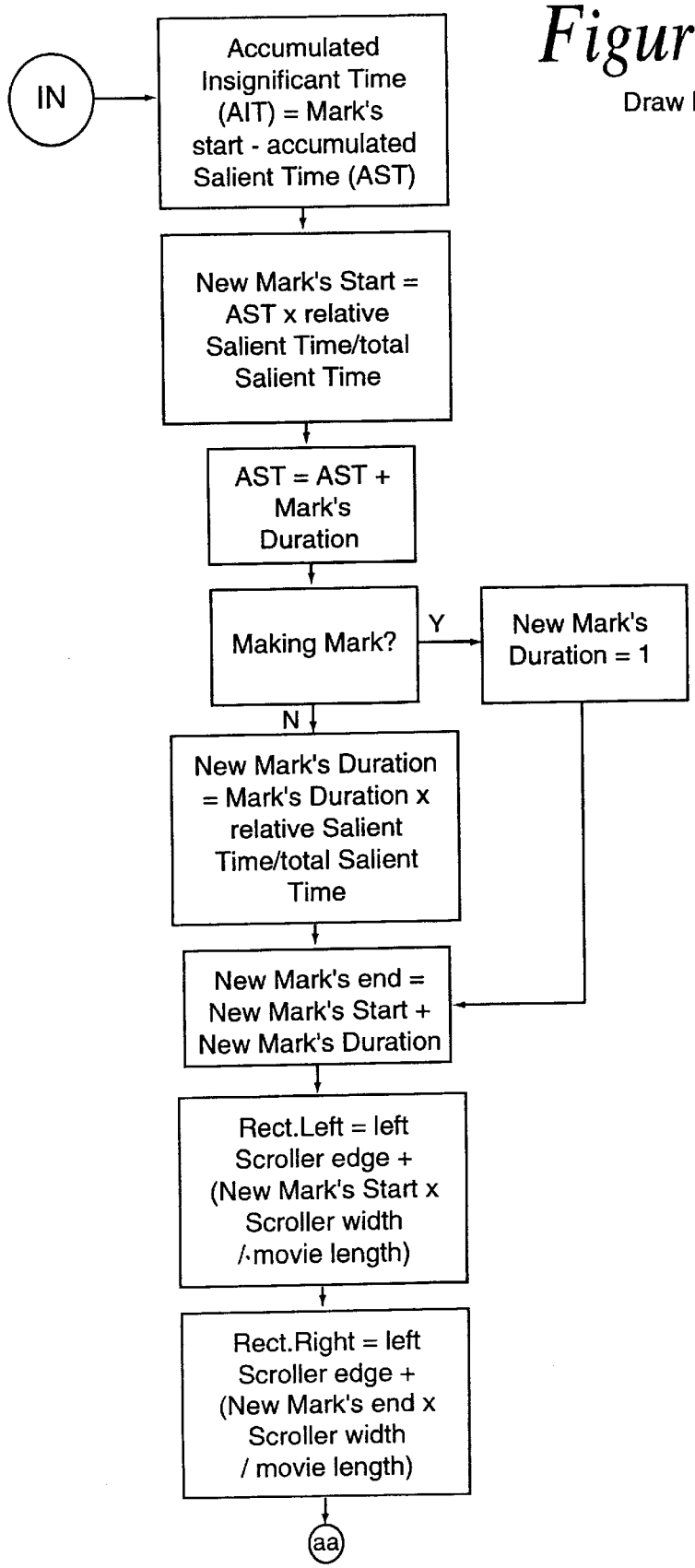
Figure 32B:
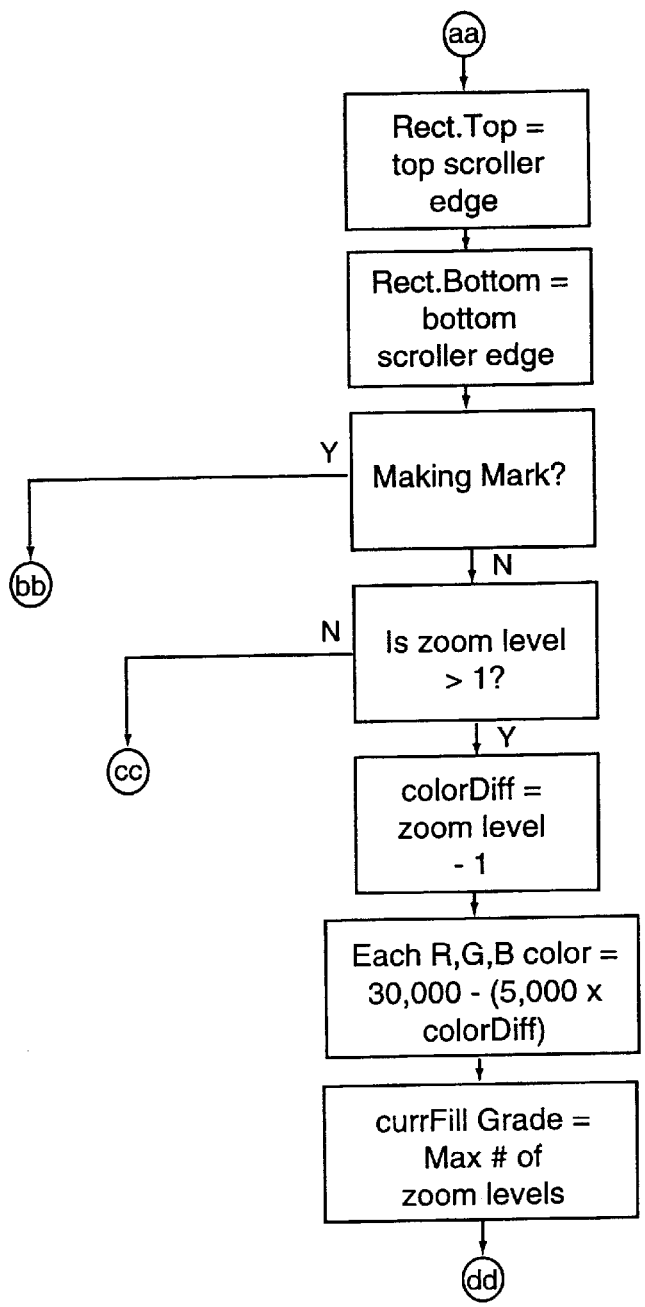
Figure 32C:
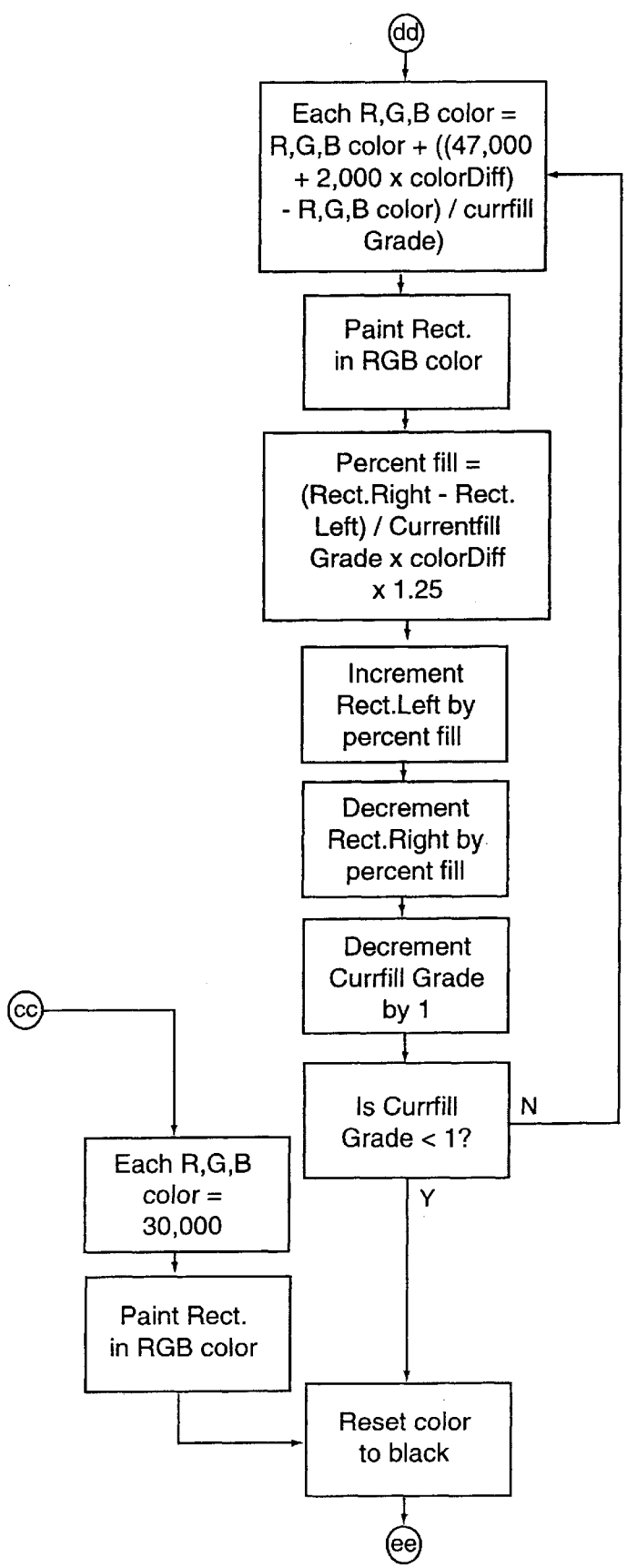
Figure 32D:
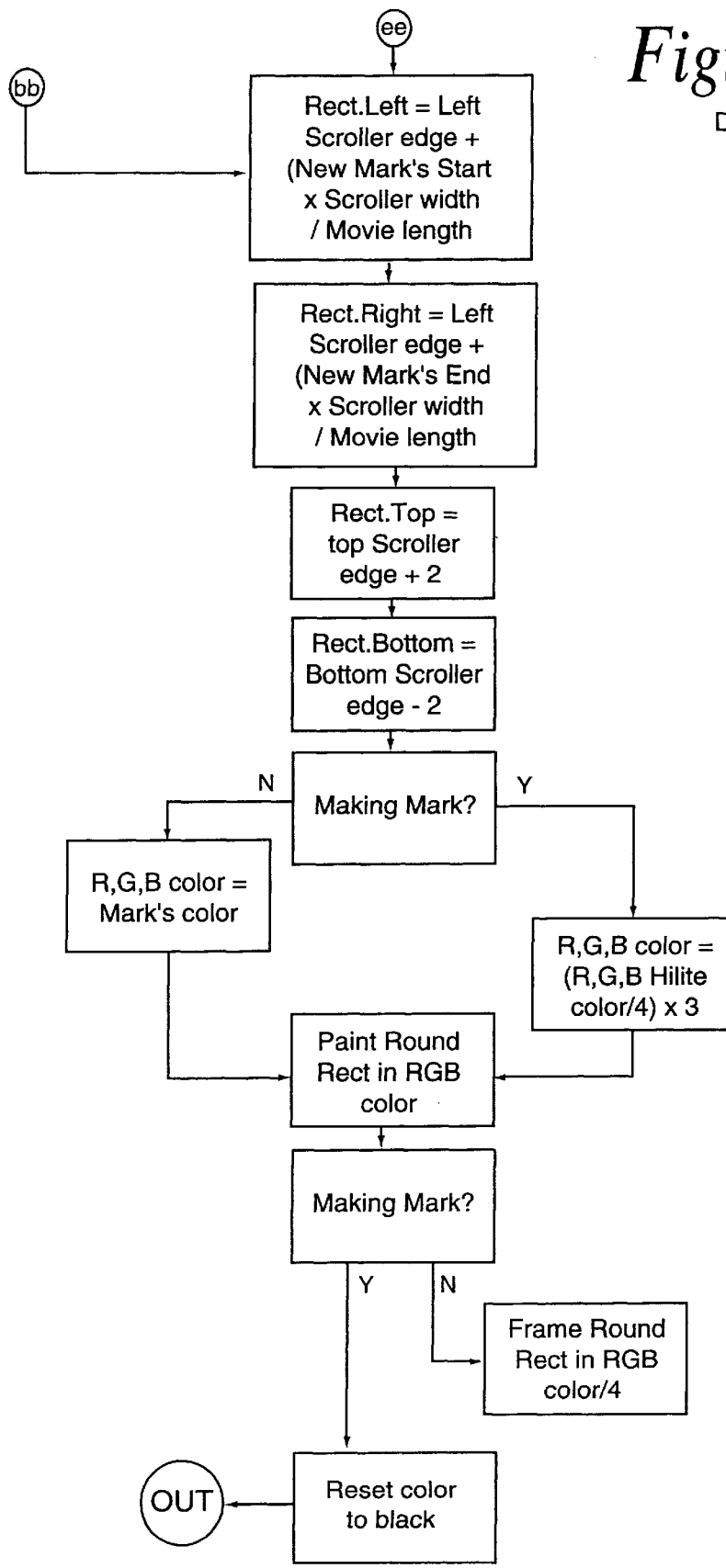
Figure 33:
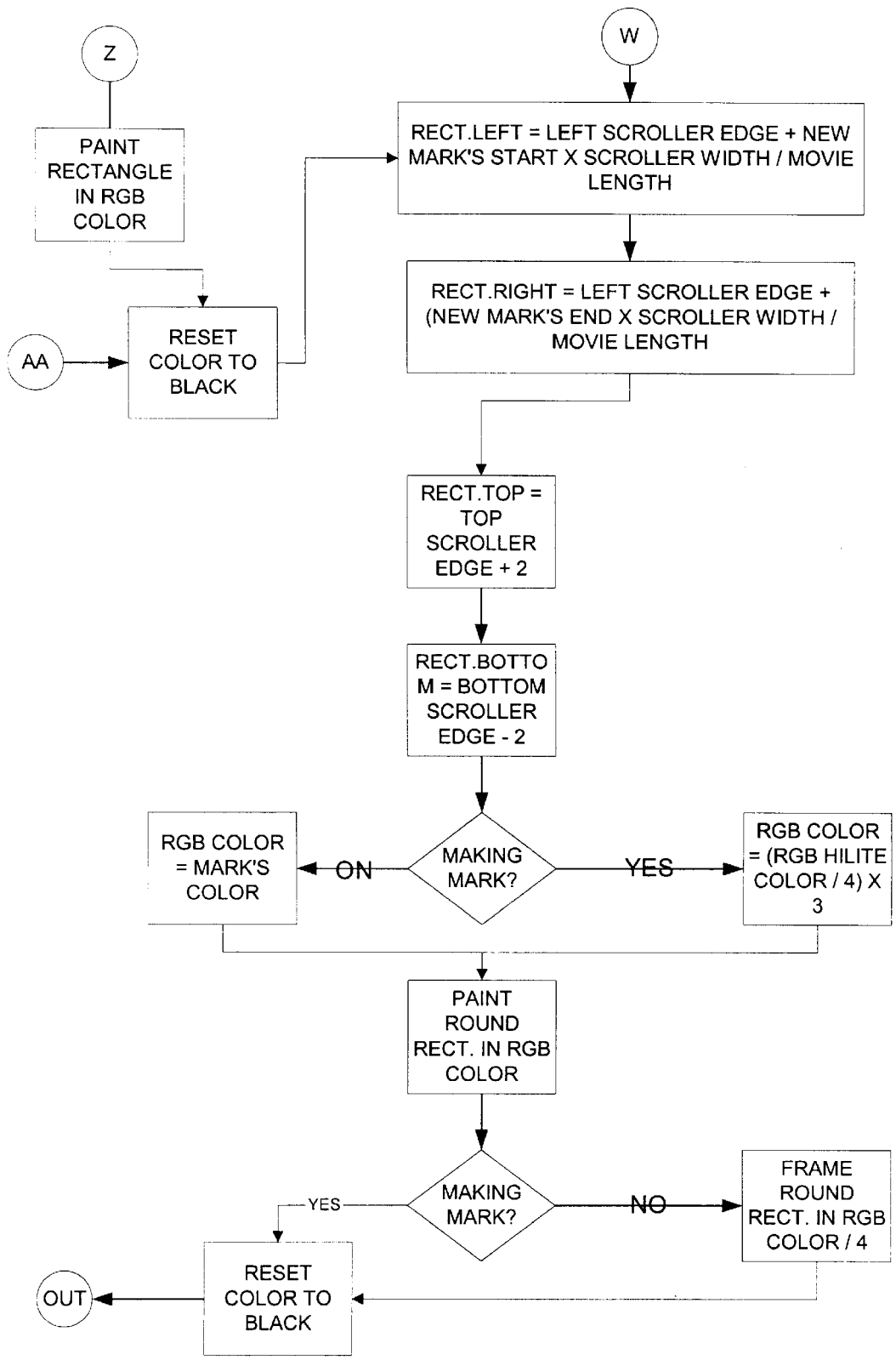

The person skilled in the art will have no trouble in understanding and implementing the flow charts illustrated. Virtually all of the statements printed in the flow chart boxes are understandable, and no need exists to repeat the text herein. However, certain statements require some explanation. The statements in the blocks indicated by double lines, such as block 85 in FIG. 17, represent calls to subroutines as labeled that are detailed in another of the figures. Thus, the Track Thumb routine 85 flow chart is shown in FIG. 29. In the labels, "button" refers to the mouse button, a "pressed" button, as in the Macintosh, changes its 3-d appearance to appear pressed; an "unpressed" button is the reverse. "Play segment" refers to the right button 84 in FIG. 12. The examples given are with a colored scroll bar to represent the marked segments. "Zoom" designates magnification level. "Stamp cursor" means that when the screen cursor is moved within the movie displays, the cursor shape changes to resemble a rubber hand stamp, indicating to the user that by clicking, he or she can mark (stamp) the document to indicate a salient point. "Play speed" refers to play speed of the video. "Update scroller" means to redo the scroll bar to show user selections. Conducting tests are indicated in the boxes by question marks (?); Y or N indicates the test was or was not successful.

To summarize some important aspects of the invention:

Linear density of scroll bar (i.e. ruler) can be varied with document salience density;

Scrolling rate can be varied with document content density;

Amount of document in window can be varied with document salience density;

The zoom control function can be implemented by clicking the scale perspective button and dragging perpendicular to scroll bar to zoom between perspectives:
drag out from document->absolute scaling and
drag towards document->relative scaling.

As a further alternative, the user can press an option key and click on the scroll bar, which will jump the thumb to the pointer position and simultaneously allow the user to scroll by moving the mouse horizontally and to change scale or magnification by moving the mouse perpendicularly (vertically) to the scroller. These changes will be visible on the screen display as well as on the scroll bar.

Since the program of the invention runs as an application, clicking on the document display can readily be used to add to the document data structure in memory the time or spatial position of the salient marked display portion when/where the pointer rested.

Marking data structures will be evident to those skilled in the art. For text documents, adding a mark is generally similar to adding a formatting or printing code to the stored text. Marking video is similar to text marking, except that remembering character position is replaced by remembering time position and storing it in the user data portion of the movie.

As further marking alternatives, for video, the mouse button for marking can be held depressed while the video plays and released to define a marking point or segment. For text, the salient text can be highlighted and a menu dropped to select a marking function.

Although there have been described what are at present considered to be the preferred embodiments of the invention, it will be understood that the invention may be embodied in other specific forms without departing from the essential characteristics therof. The present embodiments are therefore to be considered in all respects as illustrative, and not restrictive. This scope of the invention is indicated by the appended claims rather than by the foregoing description.

APPENDIX A

1. Mackinlay, J., Robertson, G., and Card, S. The Perspective Wall: Detail and Context Smoothly Integrated. Proceedings ACMCHI '91 Human Factors in Computing Systems Conference (New Orleans, La., Apr. 27–May 2, 1991). ACM, New York, pp. 173–179.
2. Furnas, G. Generalized Fisheye Views. Proceedings ACM CHI '86 Human Factors in Computing Systems Conference (Boston, Mass, Apr. 13–17, 1986). ACM, New York, pp. 16–23.
3. Mills, M., Cohen, J., & Wong Y. Y. A Magnifier Tool for Video Data. Proceedings ACM CHI '92 Human Factors in Computing Systems Conference (Monterey, Cailf., May 3–7, 1992). ACM, New York, pp. 93–98.
4. Degen, L., Mander, R., Salomon, G. Working with Audio: Integrating Personal Tape Recorders and Desktop Computers. Proceedings ACM CHI '92 Human Factors in Computing Systems Conference (Monterey, Calif., May 3–7, 1992). ACM, New York, 1992, pp. 413–418.
5. Chimera, R. Value Bars: An Information Visualization and Navigation Tool for Multi-attribute Listings. Proceedings ACM CHI '92 Human Factors in Computings Systems Conference (Monterey, Calif., May 3–7, 1992). ACM, New York, pp. 293–294.

What is claimed is:

1. A method of displaying related objects in a computerized system comprising the steps of:

(a) forming a normal display of a succession of objects;

(b) providing indicia marking at least one segment of successive objects within the succession of the objects, wherein each object in each marked segment is displayed occupying a region of the display based on a proportion to said object's size and any objects not in any marked segment are displayed occupying a smaller region of the display;

(c) forming a scrollbar on the display alongside the succession of the objects, wherein the scrollbar includes a scroll thumb at a location corresponding to that of the particular objects displayed with respect to their place within the entire succession of the objects; and (d) representing the beginning to the end of each marked segment with an elongated area on the scrollbar; and (e) means of changing perspective scaling of all marked segments by selectively changing the proportion used.

2. The method of claim 1, further comprising changing the size of the scroll thumb in relation to the proportion used.

3. The method of claim 1, further comprising changing the appearance of the scroll bar in relation to the size of the objects in all marked segments to the size of all of the objects in the succession of the objects.

4. The method of claim 3, wherein said changing of appearance of the scroll bar includes changing the density of the scroll bar.

5. The method of claim 3, wherein said changing of appearance of the scroll bar includes changing the color of the scroll bar.

* * * * *